United States Patent
Di Girolamo et al.

(10) Patent No.: US 11,070,456 B2
(45) Date of Patent: Jul. 20, 2021

(54) METHODS TO MONITOR RESOURCES THROUGH HTTP/2

(71) Applicant: CONVIDA WIRELESS, LLC, Wilmington, DE (US)

(72) Inventors: Rocco Di Girolamo, Laval (CA); Hongkun Li, Malvern, PA (US); Quang Ly, North Wales, PA (US); Chonggang Wang, Princeton, NJ (US); Vinod Kumar Choyi, Conshohocken, PA (US); Zhuo Chen, Claymont, DE (US); Xu Li, Plainsboro, NJ (US); Shamim Akbar Rahman, Cote St. Luc (CA); Catalina Mihaela Mladin, Hatboro, PA (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/315,312

(22) PCT Filed: Jul. 7, 2017

(86) PCT No.: PCT/US2017/041123
§ 371 (c)(1),
(2) Date: Jan. 4, 2019

(87) PCT Pub. No.: WO2018/009815
PCT Pub. Date: Jan. 11, 2018

(65) Prior Publication Data
US 2019/0245767 A1     Aug. 8, 2019

Related U.S. Application Data

(60) Provisional application No. 62/359,849, filed on Jul. 8, 2016.

(51) Int. Cl.
| | |
|---|---|
| H04L 12/26 | (2006.01) |
| H04L 29/08 | (2006.01) |
| H04L 29/06 | (2006.01) |

(52) U.S. Cl.
CPC ...... *H04L 43/0876* (2013.01); *H04L 43/0811* (2013.01); *H04L 43/0864* (2013.01);
(Continued)

(58) Field of Classification Search
CPC ............ H04L 43/0811; H04L 43/0876; H04L 43/0864; H04L 67/143; H04L 67/145; H04L 67/164
See application file for complete search history.

(56) References Cited

U.S. PATENT DOCUMENTS

| | | | |
|---|---|---|---|
| 5,754,752 A | 5/1998 | Sheh et al. | |
| 5,933,604 A * | 8/1999 | Inakoshi | ............ H04L 41/046 709/226 |

(Continued)

OTHER PUBLICATIONS

"The WebSocket API" http://www.w3.org/TR/2011/WD-websockets-20110419/, Apr. 2011, 15 pages.
(Continued)

*Primary Examiner* — Azizul Choudhury
(74) *Attorney, Agent, or Firm* — BakerHostetler

(57) ABSTRACT

Methods are described that can enable resource monitoring over HTTP/2. These methods may rely on using multiple streams over persistent connections and on the HTTP/2 Push mechanism. Furthermore, a mechanism is proposed that can enable resource monitoring over multiple servers.

16 Claims, 34 Drawing Sheets

(52) U.S. Cl.
CPC .......... *H04L 67/143* (2013.01); *H04L 67/145* (2013.01); *H04L 69/164* (2013.01)

(56) References Cited

U.S. PATENT DOCUMENTS

| | | | | |
|---|---|---|---|---|
| 6,980,515 | B1* | 12/2005 | Schunk | H04L 45/00 370/230.1 |
| 7,246,159 | B2* | 7/2007 | Aggarwal | G06F 11/3495 709/220 |
| 2005/0216421 | A1* | 9/2005 | Barry | G06F 11/0709 705/64 |
| 2008/0162703 | A1 | 7/2008 | Stevens et al. | |
| 2008/0282080 | A1* | 11/2008 | Hyndman | H04L 41/5003 713/150 |
| 2014/0130054 | A1* | 5/2014 | Molkov | G06F 9/5072 718/104 |
| 2016/0080267 | A1* | 3/2016 | Okada | G06F 9/5027 709/224 |

OTHER PUBLICATIONS

Belshe et al., Internet Engineering Task Force (IETF) RFC: 7540, Hypertext Transfer Protocol Version 2 (HTTP/2), May 2015, 96 pages.
Benfield, Hypertext Transfer Protocol Working Group, "Peer-to-peer Extension to HTTP/2 draft-benfield-http2-p2p-01", Jul. 2015, 8 pages.
Bormann et al., Internet Engineering Task Force (IETF) RFC: 7228, "Terminology for Constrained-Node Networks", May 2014, 17 pages.
Ericsson, et al., Internet Engineering Task Force (IETF) RFC: 6202, "Known Issues and Best Practices for the Use of Long Polling and Streaming in Bidirectional HTTP", 19 pages.
Fette et al., Internet Engineering Task Force (IETF), RFC 6455, "The WebSocket Protocol", Dec. 2011, 71 pages.
Hartke et al., "Internet Engineering Task Force (IETF) RFC: 7641, Observing Resources in the Constrained Application Protocol (CoAP)", Sep. 2015, 30 pages.
https://datatracker.ietf.org/doc/charter-ietf-hybi/, "BiDirectional or Server-Initiated HTTP" Jan. 21, 2010, 2 pages.
Lentczner et al., Internet Engineering Task Force, "Reverse HTTP draft-lentczner-rhttp-00", Mar. 2009, 7 pages.
Limmat: Where Web Meets BLE, Home Blog About Limmat, "HTTP/2—The New IoT Protocol?", Feb. 18, 2015, 4 pages.
Nottingham et al., HTTP Working Group Internet-Draft, "HTTP Alternative Services draft-ietf-httpbis-alt-svc-08", Sep. 2015, 22 pages.
Shelby et al., Internet Engineering Task Force (IETF) RFC: 7252 "The Constrained Application Protocol (CoAP)", Jun. 2014, 112 pages.
The scalability problem with using HTTPS for M2M, https://realtimelogic.com/articles/The-scalability-problem-with-using-HTTPS-for-M2M, Nov. 2015, 4 pages.

\* cited by examiner

METHODS TO MONITOR RESOURCES THROUGH HTTP/2

CROSS-REFERENCE TO RELATED APPLICATIONS

This application is the National Stage Application of International Patent Application No. PCT/US2017/041123 filed Jul. 7, 2017 which claims the benefit of U.S. Provisional Patent Application No. 62/359,849, filed Jul. 8, 2016, titled "Methods to Monitor Resources Through HTTP/2," the contents of which are hereby incorporated by reference in their entireties.

BACKGROUND

Typical web based communication relies on a pull model, where a client 102 requests a service/resource from a server 104, and the server 104 responds to the client request. This works well for many applications, for instance viewing static web-pages, but is not very efficient for dealing with applications which are very dynamic (e.g. near real-time stock quotes). Server push or server initiated communication describes a mechanism which is better suited to deal with such dynamic applications, where the transaction is initiated by a server 104 and not by a client pull request. This is sometimes referred to as a publish/subscribe model, since it may be used in cases where a client 102 subscribes to be notified about published results.

The publish/subscribe model is expected to play a very big role in the Internet of Things (IoT), where applications may want to be notified when some asynchronous event happens at an endpoint (when the temperature in a room changes significantly, an alarm is triggered, etc.).

With Hypertext Transfer Protocol (HTTP), a client 102 wanting to perform some actions on a server 104 must first establish a connection to the server 104, and then send the server a HTTP request. In order to serve these requests, the server 104 accepts the connection from the client 102, and subsequently sends back a response containing the result of the requested action. The server 104 cannot (1) autonomously initiate a connection to the client 102; and (2) send an unsolicited response (that is without an accompanying request).

In order for the client 102 to make sure that it hasn't missed any important events on the server 104, it could regularly poll the server 104 by periodically performing a GET action. The frequency of the polling dictates how fast a client 102 is informed of a server event. If the polling is very frequent, the client 102 is informed sooner. However, the system is bandwidth inefficient since the majority of the polling requests result in client-server exchanges that do not signal a new event. On the other hand, if the frequency of the polling is reduced, the bandwidth efficiency is improved. That is, most polling requests result in client-server exchanges that signal a new server-event. However, the system suffers from high response latency, which is the time between when a new event occurs to the next client request. For example, consider an event that occurs just after a polling request. In such a case, the client 102 would have to wait for the next polling request to be notified about the server event. The periodic polling solution is shown in FIG. 1A.

To address these issues, various HTTP tricks have been used to provide asynchronous server-initiated communication. These fall into one of two broad categories: HTTP long polling and HTTP streaming.

HTTP long polling is also sometimes referred to as a Hanging GET, AJAX PUSH, or Reverse AJAX. The basic mechanism is for the client 102 to always have an ongoing polling request. Upon receiving the polling request, the server 104 does not immediately send a response. Rather it leaves the Transmission Control Protocol (TCP) connection open and waits for the event. When the event occurs, it issues the response to the polling request, thereby eliminating the high latency issue described earlier. Upon receiving the response, the client 102 issues a fresh polling request. In addition to this basic mechanism, the client 102 and server 104 may also use a simple timeout mechanism to prevent the connection from staying open too long and possibly being closed by some middleware device. Popular products such as Facebook's Chat were first deployed using HTTP Long Polling. The HTTP long polling solution is shown in FIG. 1B.

HTTP long polling does not rely on any changes to HTTP. Rather it may rely on some web browser script (for instance in JavaScript) to manage the logic to perform the polling. The client 102 often uses the XMLHttpRequest (XHR) application programming interface (API) to enable the asynchronous HTTP exchanges. HTTP long polling may alternatively rely on some servlet (or other dynamic web content technology such as PHP (PHP: Hypertext Preprocessor) or Active Server Pages (ASP)) to manage keeping the connection open at the server 104.

Note that for HTTP Long Polling, the client 102 has the option to open a new HTTP connection for each request/response exchange (only closing the connection after receiving the server response). Alternatively, the client 102 can keep a single connection open and have multiple long polling exchanges within this connection. In this case, the client 102 would need to ask the server 104 to use a persistent HTTP connection, where the server 104 will maintain its TCP connection open, even after sending its response. HTTP persistent connections are the default behavior in HTTP/1.1, and can be configured in HTTP/1.0 through the keep-alive header option. In both cases, the TCP connection will remain open until either (1) it is explicitly closed by the client 102 or the server 104 (typical range for Apache server timeout is from 5-15 seconds), or (2) it is closed by a middlebox (e.g a timeout at a NAT or firewall).

In contrast to long polling, HTTP streaming does away with the polling concept by having the server 104 keep the connection open indefinitely. As illustrated in FIG. 2, the transfer starts with the client 102 issuing a request. The server 104 accepts the connection request and keeps this connection open. As events occur, the server 104 sends the relevant information to the client 102, all the while not closing the connection. The end of transfer can be signaled either through the use of the "end-of-transfer" indication for chunked transfer encoding, or through the termination of the connection for the server 104. These two options are briefly described below.

For the case that the end of transfer is signaled through the use of an "end-of-transfer" indication, the server 104 will set "Transfer-Encoding" as chunked, and then it will stream the relevant pieces of information as each event occurs. For each event, the server signals the size of the relevant information followed by the information. The end of the transfer is signaled with an indication—that is, a server message of size 0. For example, the following shows the server transmissions for two events. For event 1, the information to be sent to the client 102 is the 36 (0x24) character text string: This is the data for the first chunk. For event 2, the information to be sent to the client 102 is the 28 (0x1C) character text string: and this is the second chunk.

For the case that the end of transfer is signaled by terminating a connection, the server 104 does not use chunked transfer encoding. Instead, the transfer starts with a HTTP response with no Content-Length header or Transfer-Encoding header, and for every event, the relevant piece of information is sent.

W3C has standardized Server-Sent Events (SSEs) which defines an API that allows servers to push data to clients over HTTP in the form of Document Object Model (DOM) events. The client 102 initiates a transfer through an Event-Source API. This will trigger a client script to issue a HTTP request to the server 104 with an Accept Header of "text/event-stream". The server 104 will respond with a custom "text/event-stream" content-type and subsequently stream the results of the events in Unicode Transformation Format-8 (UTF-8) encoded data. Additionally, SSE allows the server 104 to specify:

1) Retry interval: length of time the client script is to wait before attempting to reconnect if ever the connection drops;
2) Optional data ID: The ID is used to allow recovery from a connection drop by informing the client script about the ID of the last seen message. If a stream is resumed, the client script can include a "Last-Event-ID" in the HTTP header, which tells the server 104 to resume streaming the event information from the next ID.
3) Optional event type: The event type allows event specific actions to be performed by the client script, depending on the type of event at the server 104.

For example, with reference to FIG. 3, the following shows the server transmissions for 5 events. The server 104 first sets the retry interval to 15 seconds in case the connection between the client 102 and server 104 is dropped. Then 5 events are triggered at the server 104. Each event boundary is marked by an empty newline.

Event 1 at the server 104 transfers the string "First message is a simple string";
Event 2 at the server 104 transfers a JSON message;
Event 3 at the server 104 transfers a text message of type "foo";
Event 4 at the server 104 transfers a multiline text message of type "bar" and message ID=42;
Event 5 at the server 104 transfers a text message with message ID=43;

One important caveat is that the event-stream protocol is specifically designed to transfer UTF-8 data. Binary streaming would require that the binary information be encoded to UTF-8 data, which leads to certain inefficiencies.

In order to address some of the inefficiencies of HTTP streaming and HTTP polling, the Internet Engineering Task Force (IETF) has a BiDirectional or Server-Initiated HTTP (HyBi) working group, to define "a bidirectional communication between an HTTP client 102 and an HTTP server 104 that provides greater efficiency than previous approaches at bidirectional HTTP" (charter-ietf-hybi-02, BiDirectional or Server-Initiated HTTP charter).

The working group is focusing on standardizing the WebSocket protocol (RFC 6455, The WebSocket Protocol), but as part of the work effort, the notion of Reverse HTTP (draft-lentczner-rhttp-00, Reverse HTTP) was also discussed.

The WebSocket protocol allows full-duplex communication between a client 102 and a server 104, thereby allowing a server 104 to send unsolicited traffic to a client 102 at any time. In a typical implementation, the client 102 starts a WebSocket connection with a server 104 through a WebSocket handshake. The IETF has standardized a handshake that is enabled through HTTP. The client 102 sends a HTTP Upgrade request to ask the server 104 to upgrade the connection to WebSocket. If the server 104 is ok with the request, it completes the handshake with a HTTP Upgrade response. The connection then proceeds using the WebSocket protocol, over the same TCP connection used for the HTTP exchange and over the same ports (80 or 443). As a result, a WebSocket connection runs over a single TCP session.

During a WebSocket connection, the client 102 and server exchange bidirectional text, binary data, and/or control signaling. Note that as the communication is bidirectional, the notion of client 102 and server 104 is not as relevant as in HTTP, and this document will sometimes use the term endpoint to refer to both of these. Data is transferred between endpoints through messages, which are made up of one or more frames. The frames can carry application data between endpoints as well as protocol-level signaling traffic (for instance to signal a connection close) (see FIG. 4). Each of these frames has a 4-14 byte header to assist the receiving endpoint to determine: (1) if this is the last fragment (frame) of a message (FIN bit); (2) the type of frame (text (UTF-8), binary, or control (4-bit opcode); (3) the length of the payload (1,3, or 9 byte length fields); and (4) the masking-key (32-bit mask). The receiving endpoint will be able to reconstruct a message from its frames, using the opcode and the FIN bit.

Once the WebSocket connection is established, both endpoints (client 102 as well as server 104) can initiate an exchange at any time. Since the WebSocket protocol is only concerned with transfer of messages between endpoints, there are no standardized methods (e.g. GET, POST, etc.) to interact with resources, and this is left entirely to the applications running on either endpoints. These applications typically use a WebSocket API, standardized by W3C (WebSocket API) to facilitate communication. FIG. 5 shows a typical example of how WebSockets could be used for server notifications.

WebSocket connections are by default long-lived and persistent. The underlying TCP connection between the client 102 and the server 104 is maintained through the use of PING and PONG frames sent by the endpoints to keep the WebSocket connection alive, even for clients/servers behind proxies, firewalls and load-balancers. Typically, a server 104 sends a PING frame to a client 102 through the WebSocket, and this client 102 responds with a PONG frame. If the client 102 does not reply, the server 104 closes the connection. It is the responsibility of the endpoints to manage the timing of PING/PONG transmissions to keep the underlying TCP connection alive.

The concept of Reverse HTTP, as defined in draft-lentczner-rhttp-00, is to establish a TCP connection between a client 102 and a server 104, and then reverse the role of client 102 and server 104 once the connection is established. This is very well suited for cases where a client 102 is unable or unwilling to accept incoming HTTP requests (say for security reasons). As a result, the client 102 (Endpoint A) starts by making a HTTP request to a server 104 (Endpoint B). Through the upgrade mechanism, Endpoint A signals that it is willing to setup a reverse HTTP connection, by requesting an upgrade to PTTH (notice that this is HTTP in reverse). If Endpoint B is also willing to setup the reverse HTTP connection, it responds to Endpoint A with a 101 Switching Protocol message. From this point, Endpoint B can act as a client 102, sending HTTP requests to Endpoint A (which acts as a server 104).

FIG. 6 shows a simple example where the server 104 initiates a PUT request to the client 102, when it needs to signal an event. The client 102 can still initiate requests to the server 104, but to do this, it is required to start a new TCP connection.

HTTP/2 was developed as part of the HTTPb is working group, in an effort to improve the binding for HTTP semantics to the underlying transport (RFC 7540, Hypertext Transfer Protocol Version 2 (HTTP/2)). The motivation for this improved binding came mostly from the evolution of web pages—the main target resource for HTTP. These have significantly evolved since the release of HTTP/1.1. Today, a single web page is much larger and much more resource intensive (requires the retrieval of many sub-resources or assets). FIG. 7A illustrates the rise in total average size of webpages in kilobytes. FIG. 7B illustrates the rise in the total average number of requests per webpage. The trend has resulted in three main issues: (1) latency to download web pages; (2) redundant transmissions in the HTTP headers for each request/response exchange associated with all the sub-resources of the web-pages; and (3) opening many parallel TCP connections to transfer all the sub-resources of the web-pages To address these trends, HTTP/2 was designed based on the following principles:

- Use of same HTTP methods, status codes, and semantics as HTTP/1.1. This allows re-use of same the APIs as HTTP/1.1.
- Binary, instead of text-based. This makes the messages more efficient to parse and more compact in transmission, at the expense of becoming less amenable to debugging
- Fully multiplexed, instead of ordered and blocking. This allows multiple request and response messages in flight at the same time
- Use of one connection for parallelism. The fewer TCP connections results in less congestion, less impact of slow start, and an increased fairness to other TCP connections
- Header compression to reduce redundant header information
- New "built-in" server push mechanism that allows for a server 104 to proactively send "push" responses. The key is that it is a promise to push data and the client 102 can actually refuse the pushed data.
- Prioritization of requests, thereby allowing more important requests to complete more quickly.

An HTTP/2 connection 802 is shown in FIG. 8. Each connection 802 maps to a single underlying TCP connection. The left side shows a "physical view" of the connection 802 while the right side shows a logical view. A connection 802 is made up of set of streams, with each stream carrying frames between the two endpoints. New streams are created as needed, with each new stream being given a stream identifier (incremented by 1 for each new stream). Old streams (that are no longer needed for a request/response exchange) are closed. The closed streams cannot be reused for future traffic. As a result, if a client 102 needs additional streams and none are available (the maximum number of streams, as set by parameter SETTINGS_MAX_CONCURRENT_STREAMS, has been reached) the client 102 starts a new HTTP/2 connection 802. From the "physical view", the frames from each stream are multiplexed.

The concept of a stream is especially important in HTTP/2. The streams may be started in parallel, with each stream corresponding to a single Request/Response exchange. Streams can be assigned a certain priority when they are created and this priority can be changed dynamically. HTTP/2 does not specify any specific algorithm for dealing with priorities. HTTP/2 just provides the mechanism by which the priority data can be exchanged between a client 102 and server 104. The prioritization algorithm is implementation specific to the client 102 and server 104. Furthermore, each of the streams 804 is subject to flow control, with the receiver specifying how many bytes it is willing to accept. A single TCP connection 802 controls the number of packets in transit between the peer endpoints in order to maximize throughput and minimize congestion. In one of these TCP connections, there may be many HTTP/2 streams 804 that are multiplexed. These streams 804 contend for the available shared bandwidth resources of the TCP connection 802. Although stream priorities can help determine the relative order of delivery, alone they are insufficient to control how the resource allocation is performed between the streams 804; this is where the HTTP/2 flow control comes in. During the standardization process, there was some concern over the complexity of the HTTP/2 flow control, and the potential impact from naïve implementations. As a result, the specification actually recommends disabling flow control on the receiver end, unless absolutely needed.

Currently HTTP/2 supports 10 frame types:

DATA: carries the payload messages that are in the HTTP/1.1 Request/Response messages HEADERS: Carries the Header List and the "pseudo headers" of the HTTP/1.1 Request/Response messages PRIORITY: used by sender to request that a receiver change the priority of a stream RST_STREAM: Used by a sender to request that a receiver terminate a stream SETTINGS: Used in the establishment of the HTTP/2 connection 802 to exchange preferences PUSH_PROMISE: Used for dynamic server push, allowing a server 104 to send response frames to a client 102 without a prior client request.

PING: allows measuring a round-trip time from the sender and checking connection status GOAWAY: Frame allowing sender to request that the receiver close the HTTP/2 connection 802

WINDOW_UPDATE: Allows a sender to update the flow-control window parameters of the receiver CONTINUATION: A frame to allow extending larger HTTP/1.1 header lists over multiple HTTP/2 frames. It is used in connection 802 with a HEADERS frame or a PUSH_PROMISE frame.

As shown in FIG. 9, each frame has a 9-octet header 902 and a variable length payload 904 (the payload can be quite large). The header 902 contains information to identify the frame and the stream to which this frame belongs. The stream information is included in a 31-bit stream identifier (stream ID)

The request messages are typically mapped to the appropriate frames by the browser, while responses are mapped to frames by the server 104. A typical mapped request/response exchange is shown in FIGS. 10A and 10B for a simple resource retrieval (retrieve a JPEG resource: /resource1 at Host: server1.example.org). The GET request is mapped to a HEADERS frame and a CONTINUATION frame, both on stream 0x17. The payloads of these frames contain the information carried in the original HTTP/1.1 request line and request header fields. The server 104 response (200 OK) is carried in 3 frames. A HEADERS and CONTINUATION frame carry the HTTP/1.1 response status line and response header fields. The actual payload is carried in a separate DATA frame. All frames from the server 104 are mapped to stream 0x17. In addition, notice that the client 102 and server 104 both indicate to each other when they are done with the stream, using an end-of-stream flag.

One important enhancement in HTTP/2 is the ability for the server 104 to push data to the client 102 without an explicit client request. The notion is termed push-promise, and is targeting the use case where a resource has many sub-resources that will likely be required. For example, some web-pages have a significant number of in-line images, or CSS files (stylesheets) that tell the browser how to display a page. In such cases, after downloading the main web-page, the browser will download the in-line images and stylesheets one at a time, each requiring a separate request/response exchange. The push-promise allows a server 104 to send these sub-resources (images, CSS files) without a request from the client 102. After receiving the original request, the server 104 builds the response, and it also deduces what future resources will be requested by the client 102 (in the example above, this includes the sub-resources of type images and CSS). Each of these future resources may trigger a push-promise. At a high level, the server 104 uses the existing stream to promise the client 102 that it will push a resource on a future reserved stream. The stream is reserved by the server 104 in a PUSH_PROMISE frame. So if an original request comes on a stream i, the server 104 may respond with a PUSH_PROMISE frame on stream i, notifying the client 102 to reserve stream j for a future pushed response. The PUSH_PROMISE frame is effectively a push request generated by the server 104. It contains all the request header fields that the server 104 attributes to the request. The server 104 then sends the pushed response as a "normal" response, but not to a client 102 initiated request, but to the server 104 created push request. FIG. 11 shows a simple server push example, where the push request is sent over 1 frames (1 PUSH_PROMISE) and the pushed response header is sent over 2 frames (1 HEADERS & 1 CONTINUATION). The figure also highlights the "signalling" overhead required to send a single pushed response.

An Internet Draft from Benfield (draft-benfield-http2-p2p-01, Peer-to-peer Extension to HTTP/2) aims to extend the notion of Reverse HTTP to HTTP/2. It allows the client 102 and server 104 to switch roles on a per-stream basis. As a result, a connection 802 between two endpoints may have some streams 804 for HTTP exchanges from client 102 to server 104 and some other streams 804 for the reverse HTTP exchanges. Endpoints advertise their support for the peer-to-peer extension, and clients are required to inform the server 104 about the authority or authorities for which it is prepared to accept requests.

As part of the HTTPbis working group, the mechanism of alternative services has been investigated. The mechanism allows an origin server to nominate additional means of interacting with it on the network. Clients are allowed to interact with the resources on an origin server at a separate location in the network—potentially with different protocol (for instance we start with HTTP1.1 and provide an alternate service with HTTP/2), and/or different host, and/or different port.

An alternative service is at the granularity of a server 104 (not a resource on a server). So for example, an origin server may not specify an alternate service to retrieve a specific resource.

Upon receiving a request, a server 104 may notify the client 102 of the list of alternative servers using a new Alt-Svc header (HTTP/1.1) or new ALTSVC frame (HTTP/2), that lists the alternative servers in some preferred order. The server 104 also provides the duration for which the alternative service is valid, using a "ma" (max-age) parameter. If the parameter is not present, the client 102 should treat the service as valid for 24 hours. The client 102 then has the choice of either selecting an alternative service from the server 104 provided list, or to continue with the origin server. If it selects an alternative server, the client 102 includes this information in any future requests using the Alt-Used header field. A simple exchange between a client 102 and an alternative service is shown in FIG. 12. The current IETF draft does not deal with synchronizing the resources between the server 104 and the alternative server 1202.

Although much of the design effort for HTTP/2 was to address the shortcomings of HTTP/1.1 for accessing today's web servers, consideration was given to the embedded space during the development of the specification. In fact, the goals of the large web servers are often well aligned with those of the embedded space (constrained devices and large web servers serving millions of clients both require application protocols that use less memory and are bandwidth efficient).

Features of HTTP/2 that are particularly beneficial to IoT devices (in the embedded space) include:
  Binary framing: binary protocols are more efficient to parse and more compact, resulting in smaller packets to transmit,
  Header compression: HTTP/2 uses a format called Header Compression for HTTP/2 (HPACK) to encode request and response headers. This reduces the network bandwidth and eases the processing for parsing the header,
  Server push: allows a server to provide content to a client 102 without having to wait for the client 102 to make a request. Although the push mechanism was not specifically designed for monitoring a resource, it can be tweaked to provide such a mechanism,
  Use of well-known HTTP semantics—existing applications can continue to use the HTTP/1.1 semantics,
  Base HTTP/2 specification allows for small-footprint implementations—many of the advanced features are optional Constrained Application Protocol (CoAP) is being developed by the IETF CoRE Working Group (RFC 7252, The Constrained Application Protocol (CoAP)). CoAP is a web transfer protocol for use with constrained nodes and constrained (e.g., low-power, lossy) networks. CoAP uses a similar client/server model to HTTP. Clients request an action (method) on a resource (URI) of the server 104. The server 104 issues a response with potentially a resource representation. Nodes can be both clients and servers.

As illustrated in FIG. 13, CoAP 1302 sits between the application 1304 and the transport protocol 906. One could think of CoAP logically as using a two-layer approach: a CoAP messaging layer used to deal with User Datagram Protocol (UDP) 1306 and the asynchronous nature of the interactions, and the request/response interactions, carried over the CoAP messages, using Methods (GET, PUT, POST, DELETE) and Response codes.

The base CoAP protocol does not work well when a client 102 is interested in having the resource representation over a period of time. CoAP Observe (RFC 7641, Observing Resources in the Constrained Application Protocol (CoAP)) extends the base CoAP core protocol with a mechanism for a CoAP client 102 to "observe" a resource on a CoAP server 104. The client 102 registers its interest in a resource by issuing an extended GET request to the server 104. This request causes the server 104 to add the client 102 to the list of observers of the resource.

FIG. 14 shows an example of a CoAP client 102 registering its interest in a resource (/temperature). The server 104 sends a response with the current state of the resource upon registration. Subsequently, upon every state change of the resource, the CoAP server 104 sends a notification (an additional CoAP response) to the CoAP client 102, with the new representation. CoAP Observe is a subscribe-notification mechanism where one Request results in multiple Responses.

The client 102 correlates the notifications to the original request through the token carried in the response message header and the Observe sequence number carried in the Observe Option. The Observe sequence number (included in the notifications from the server 104 to the client 102), also allow the client 102 to reorder the notifications, in case these arrive out of order. A client 102 remains on the list of observers until it either: (1) deregisters (cancels its observe registration); (2) rejects a notification from the server; or (3) fails to respond to a Confirmable notification message.

SUMMARY

Monitoring resources is likely to be extremely important in future IoT implementations. A significant portion of the devices in these IoT implementations will rely on HTTP for their client/server exchanges. HTTP is not only the most prevalent application layer protocol used in the Web, but it also simplifies traversing middleboxes (firewalls and Network Address Translators (NATs)). Further, HTTP is already used across different vertical domains, and is the preferred protocol for many backend servers. Although HTTP does support resource monitoring, the current mechanisms are not efficient and/or not suited for embedded devices. In addition, HTTP/2, the next evolution of HTTP, has defined a Push mechanism for the server to send unsolicited responses to a client, but the use case is not for resource monitoring.

To solve this issue, methods are described herein that can enable resource monitoring over HTTP/2. These mechanisms may rely on using multiple streams over persistent connections and on the HTTP/2 Push mechanism. Furthermore, a mechanism is proposed that can enable resource monitoring over multiple servers.

In a first aspect, mechanisms can use client request resource monitoring on a server through a HTTP/2 enhanced GET; manage, and refresh this resource monitoring; and delete the resource monitoring.

In one alternative (1A), this mechanism can include the client to refresh the monitoring in order to keep the HTTP/2 connection open. In addition, the mechanism can include new functionality allowing a client/server to delete an old stream that is no longer used for the resource monitoring.

In a second alternative (1B), this mechanism can include new functionality at the server to send a Push request to keep the HTTP/2 connection open. In addition, the server also uses the Push request to tell the client where to receive future monitored requests.

In a third alternative (1C), this mechanism can include a dedicated heartbeat mechanism to keep the HTTP connection open and on a separate mechanism to refresh the monitoring. The heartbeat mechanism implemented either by transmission of special empty DATA/HEADERS frames or new HEARTBEAT frames on a reserved stream.

A mechanism (2A) is proposed that can deal with long-lived resource monitoring that may be interrupted with broken HTTP connections. This mechanism (2A) can include:
  The client providing the server a list of available ports that it is willing to leave open in case of a HTTP connection loss.
  The server using a Push request to tell the client which one of these it will use in case of HTTP connection loss
  The server sending a UDP message to ask the client to start a new connection An alternative mechanism (2B) is also proposed to deal with long-lived resource monitoring that may be interrupted with broken HTTP connections. The mechanism (2B) can include:
  The client (EP1) providing the server (EP2) a list of available ports that it is willing to leave open in case of a HTTP connection loss and a URI where it expects the server to store monitored responses
  The server using a Push request to tell the client which one of these it will use in case of HTTP connection loss
  The server and client swapping roles. The server 104 initiating a new HTTP connection to the client and using PUT method to write monitored response to the client.

In another aspect, mechanisms are also proposed that can have clients request enhanced monitoring through a new MONITOR method, whereby the client may request the type of monitoring to perform on a resource. For example a request to monitor when the resource changes, when the resource is updated, when the resource is read, or when the resource is being monitored by some other client.

In yet another aspect, mechanisms can have servers evaluate the monitoring load and delegate monitoring to an alternative server. This mechanism can include using the HTTP/2 PING frame to determine the round trip time (RTT) between the server and client and between the alternative server and client.

In addition, new functionality is proposed that can have the client cross-reference a monitored response to an initial monitor request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

For ease of description only, the expression "client asks server to monitor resource A" may refer to a process in which a client 102 asks a server 104 to be informed about changes of state to a resource A. The client 102 issues a monitor request to a resource and the server 104 sends monitor responses to inform the client 102 about the changes in the monitored resource state. CoAP Observe is an example of a mechanism where a client 102 asks a server 104 to monitor a resource. Such monitoring of resources will be very prevalent for the IoT. Below we present three "monitor" use cases where applications are interested in the change in some remote resource.

In a first example use case (hereinafter "Use Case 1"), an application may be interested in a resource on a constrained server. For example, as illustrated in FIG. 15, an application may control a pressurized air-flow system for a semiconductor manufacturer cleanroom.

As Integrated Circuits (ICs) get more and more dense, IC traces are so close together (<30 nanometers [nm]) that a particle lying across a trace would cause a short circuit. To counter this, semiconductor manufacturers need to filter airborne particles equal to and larger than the closest trace spacing.

Figure 15:
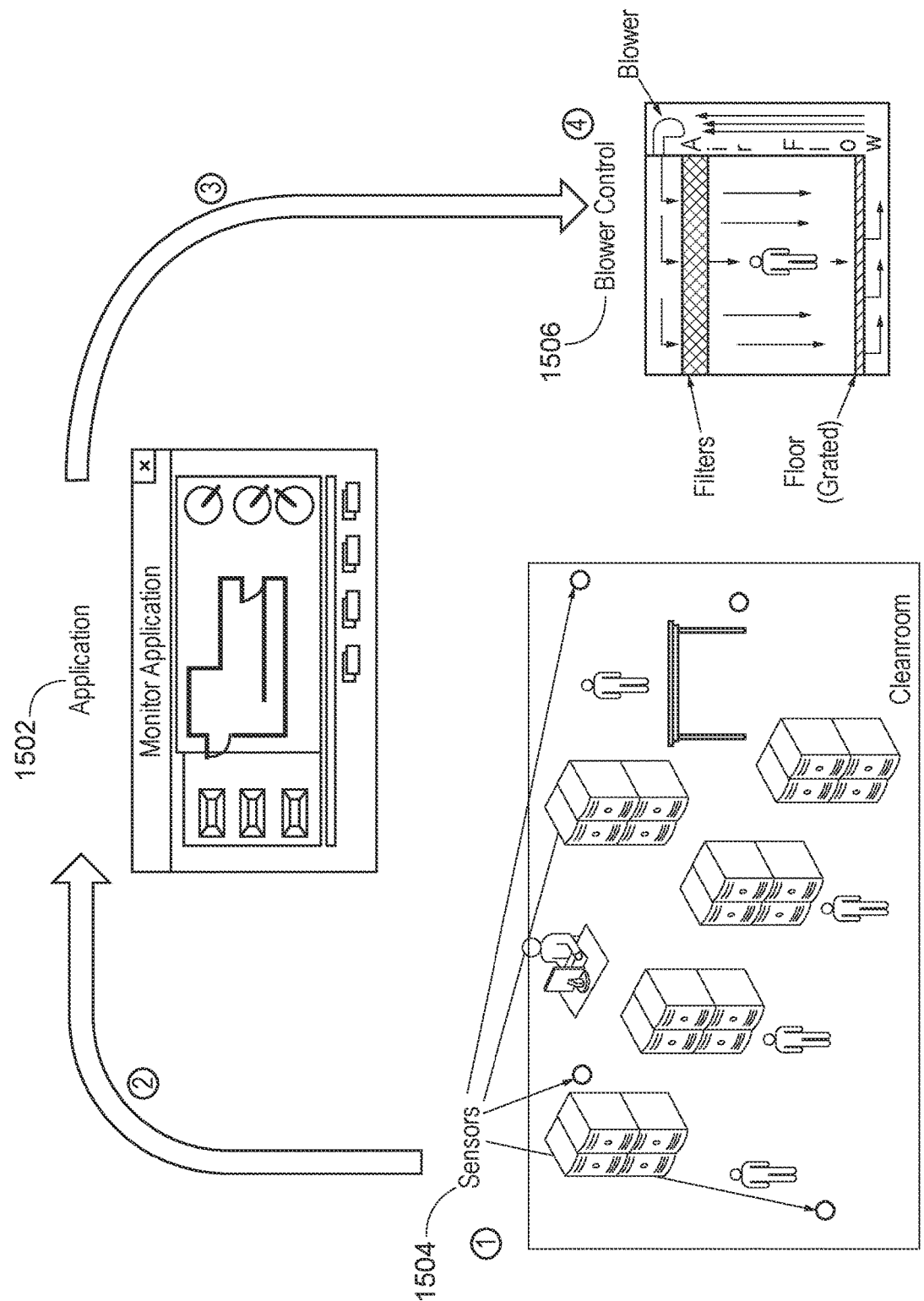
FIG. 15 is a diagram that illustrates a semiconductor manufacturer cleanroom example (use case 1).

The cleanroom shown in FIG. 15 has sensors spread throughout the facility, which regularly take particle count readings (step 1). Owing to the huge volume of sensor readings (large number of sensors 1504 and the high frequency at which measurements are taken by each of these) the application 1502 is not interested in all sensor measurements, but would prefer to monitor these so that it is aware of any trends or problem areas (step 2). When a problem is detected, the application takes corrective action by regulating the blower control 1506 (step 3). The action causes an increase in air flow near the blower 1506, in an attempt to reduce the particle count (step 4). The application 1502 may also use the monitored sensor readings to provide an analysis of particle data and to display the results in a GUI, or to trigger an alarm to a human operator.

Figure 16:
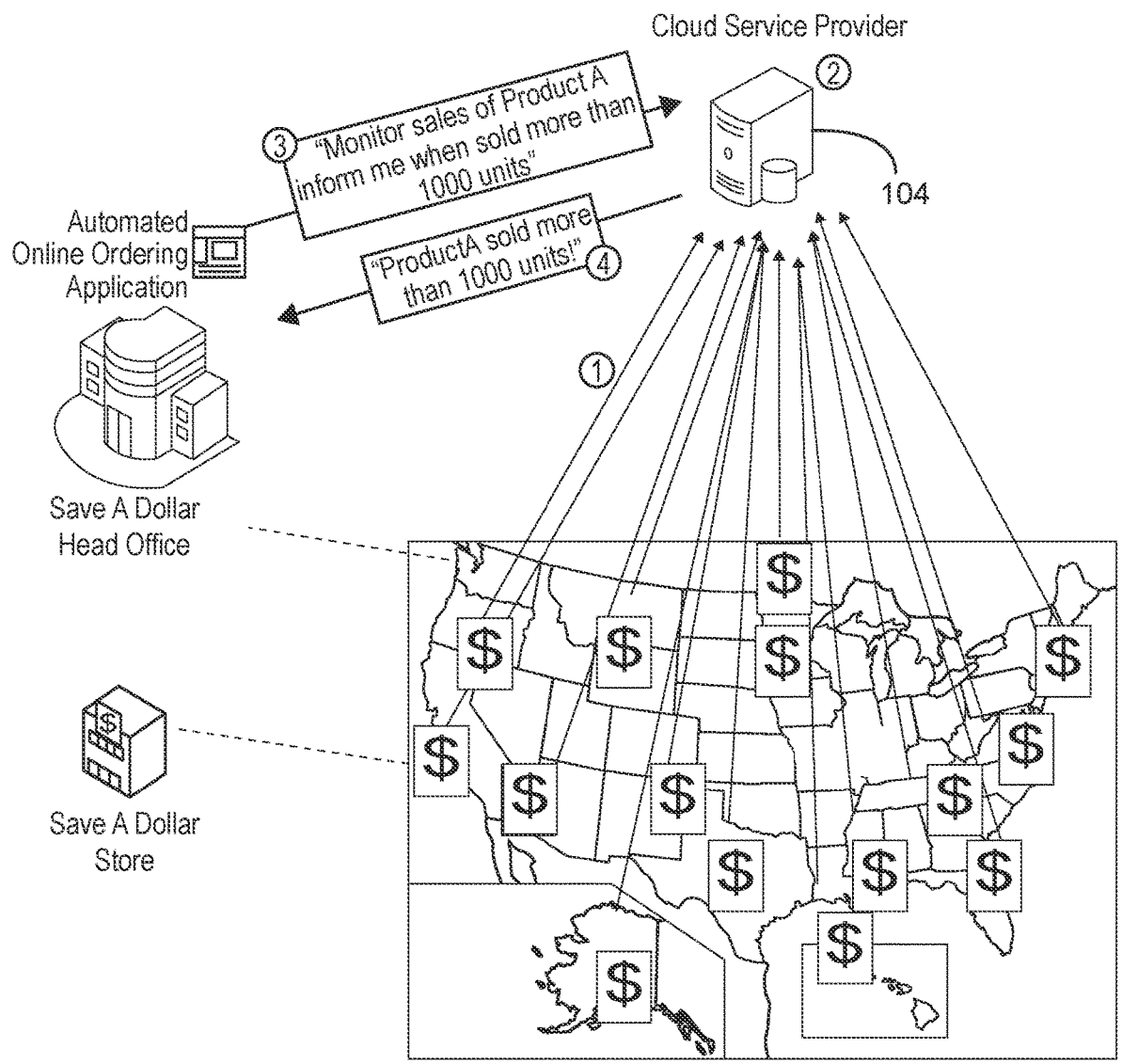
FIG. 16 is a diagram that illustrates an application interested in a resource on a server (use case 2).

In a second example use case (hereinafter "Use Case 2"), an application may be interested in a resource on a non-constrained server. In this second example use case, as illustrated in FIG. 16, an application may use information on a cloud server 104 to order inventory for its sales outlets.

In an effort to lower costs and improve customer satisfaction by better keeping its store shelves always stocked, the SaveADollar chain has moved to an automated inventory ordering system. The system can include a cloud service provider to track nationwide sales and provide advanced data analytics. Each of 350 SaveADollar stores send regular reports to the cloud server 104 to report on sales (1). The server 104 performs various data analytics on the collected information, including a simple sales count for each product in SaveADollar's inventory (2).

The automated inventory ordering system asks the cloud server 104 to monitor the sales of Product A and inform it when this has sold more than 1000 units (3). When the automated inventory ordering system is informed that this has occurred (4), the system will send a purchase order to the manufacturer of ProductA, requesting that the needed units be shipped to the SaveADollar distribution center.

Figure 17:
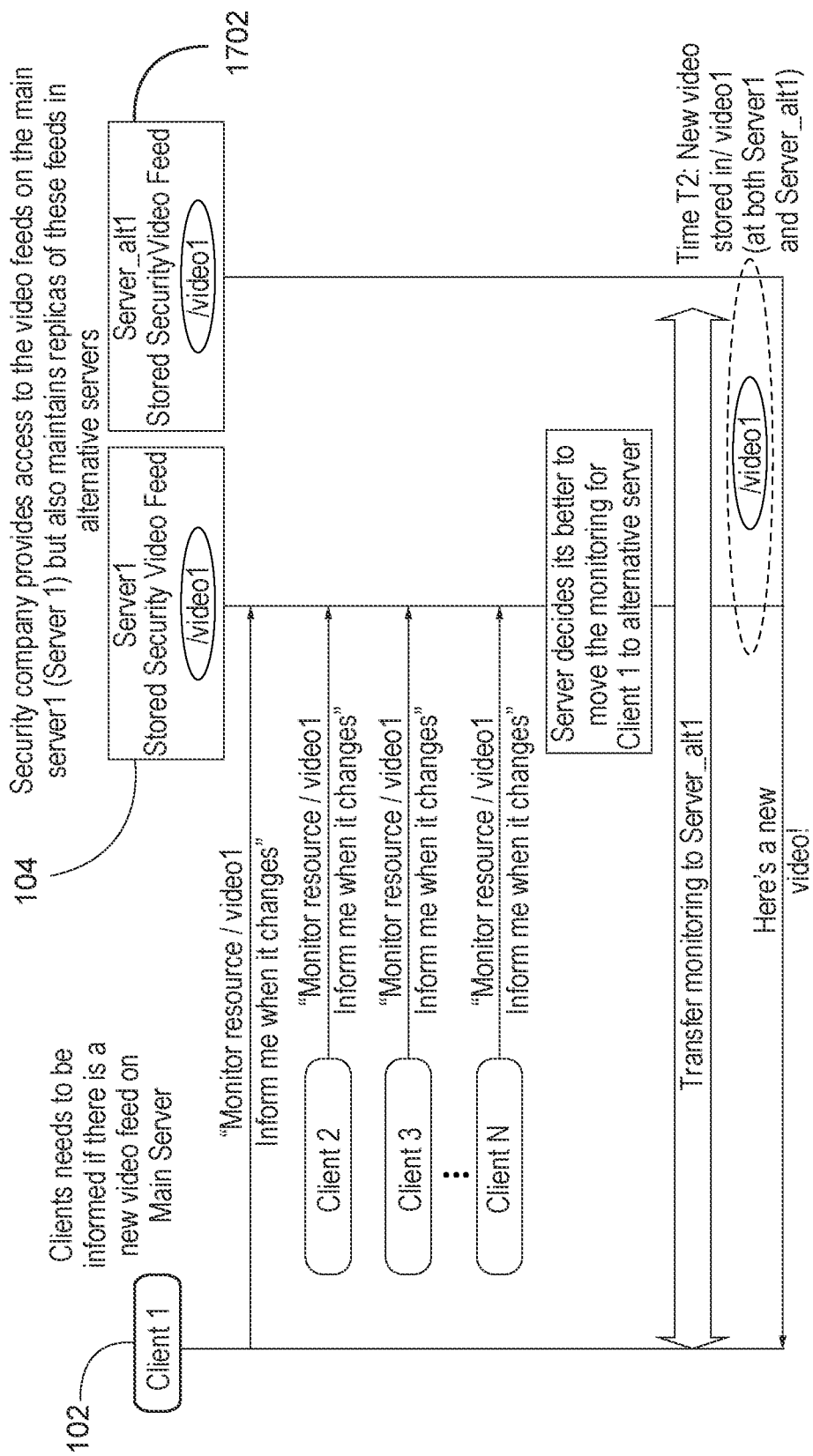
FIG. 17 is a diagram that illustrates an application interested in a resource on a server that has alternative servers (use case 3).

In a third example use case (hereinafter "Use Case 3"), an application may be interested in a resource that is hosted on multiple servers. In this third use case, as illustrated in FIG. 17, a security company may provide access to its video feeds on its main server 104 (Server1), but also maintains replicas of these feeds on alternative servers. The main server 104 may use an alternative server 1702 for any number of reasons, for example: (1) the main server 104 is under heavy load; (2) the main server 104 determines that the client 102 is in close proximity to an alternative server (proximity based on round trip delay, geography, etc.); or the main server would like to split the clients based on some operational reason (clients A,B,C support feature X, while clients L,M,N support feature Y).

Clients only know the main server, for example this may be the only server that is discoverable. The security company manages the alternative servers and makes sure that replicated resources are stored in these servers and that all the resources (video feeds) are synchronized. Furthermore it is assumed that both the main server and the alternative servers support monitoring of resources.

Client 1 (102) may ask the main server (Server1) (104) to monitor a video resource (/video1) and to be informed if a new video feed is stored on the main server. Subsequently Client 2 to Client N may ask the main server to monitor video resources. The main server continually evaluates its load and at time T2, it may determine that it needs to perform some load balancing. As a result, it may move the monitoring from Client 1 to an alternative server (Server_alt1) (1702).

Use Cases 1 and 2 are two representative examples showing a client that is interested in monitoring a resource. Many such use cases are expected in the IoT space. Any solution to enable such monitoring should keep in mind that the client 102 and/or server 104 may be a constrained device. Table 1 shows the classes of constrained devices as defined by the IETF.

TABLE 1

Classes of Constrained Devices (KiB == 1024 Bytes)
(RFC 7228, Terminology for Constrained-Node Networks)

| Name | data size (e.g., RAM) | code size (e.g., Flash) | Comments |
|---|---|---|---|
| Class 0, C0 | <<10 KiB | <<100 KiB | very constrained device (e.g sensor-like motes) likely they will not have the capability to communicate directly with the Internet in a secure manner This is not the focus of this document |
| Class 1, C1 | ~10 KiB | ~100 KiB | Device constrained in code space and processing capability Devices cannot easily talk to other Internet nodes employing a full protocol stack such as using HTTP over TCP |
| Class 2, C2 | ~50 KiB | ~250 KiB | Device is less constrained and fundamentally capable of supporting most of the same protocol stacks as used on current web clients and servers Devices would still benefit from more efficient protocols |

As a result of the limited capabilities of Class 0 devices, they do not lend themselves to monitoring of resources. For these devices, it is likely that monitoring will be enabled through some gateway device to which the Class 0 device is connected. Class 1 devices are more capable and will allow limited monitoring of resources. CoAP over UDP is likely to be the ideal solution for such devices. Although the solutions disclosed herein may be used in monitoring any of a wide variety of resources and may be used in connection with a host of different devices and servers, some of the solutions described herein may be particularly useful for monitoring of resources for resource constrained devices that are Class 2 devices as well as for devices that are not resource constrained.

Use Case 3 assumes that some solution exists for monitoring a resource but that the server 104 hosts the resource in one or more alternative servers. If one server 104 wishes to delegate a new server 104 to perform the monitoring and to inform the client 102, there is no way to: (1) tell the client 102 that the resource representation is coming from an alternative server; nor (2) negotiate the delegation of the resource monitoring to the alternative server.

None of the existing mechanisms described above in the Background provide an adequate solution to the problem of monitoring a resource, such as is presented, for example, in connection with Use Cases 1 and 2. Nor do those existing mechanisms address the issues present in connection with Use Case 3. HTTP/2 may have been designed to be applicable for IoT devices, but it does not allow for the monitoring of a resource.

Methods for Monitoring a Resource Through HTTP/2

Two different methods are described herein to enable a client 102 to monitor a resource on a server 104. The first approach relies on always trying to keep the HTTP connection open, for as long as the monitoring is needed. In the second approach, monitoring is enabled by closing the HTTP/2 connection 802 and relying on some mechanism to trigger the establishment of a new HTTP/2 connection 802 when the server 104 needs to send a response for a monitored resource.

1. Keep HTTP Connection Always Open

In a first set of methods described herein, monitoring a resource is enabled through the use of persistent HTTP/2 connections. Every monitored resource may map to a Request from a client 102, and a set of Responses from a server 104 (this will be referred to as a Request/Responses exchange). Note that if the changes in the monitored resources are infrequent, middleboxes (NATs, firewalls, etc.) may inadvertently close these idle TCP connections. To counter this, the monitoring may be refreshed after a specified duration. Two variations are considered below. In the first, the client 102 is in charge of refreshing the monitoring, while in the second variation the server 104 is responsible for refreshing the monitoring.

Method 1A: Client Refreshes Monitoring

Figure 18A:
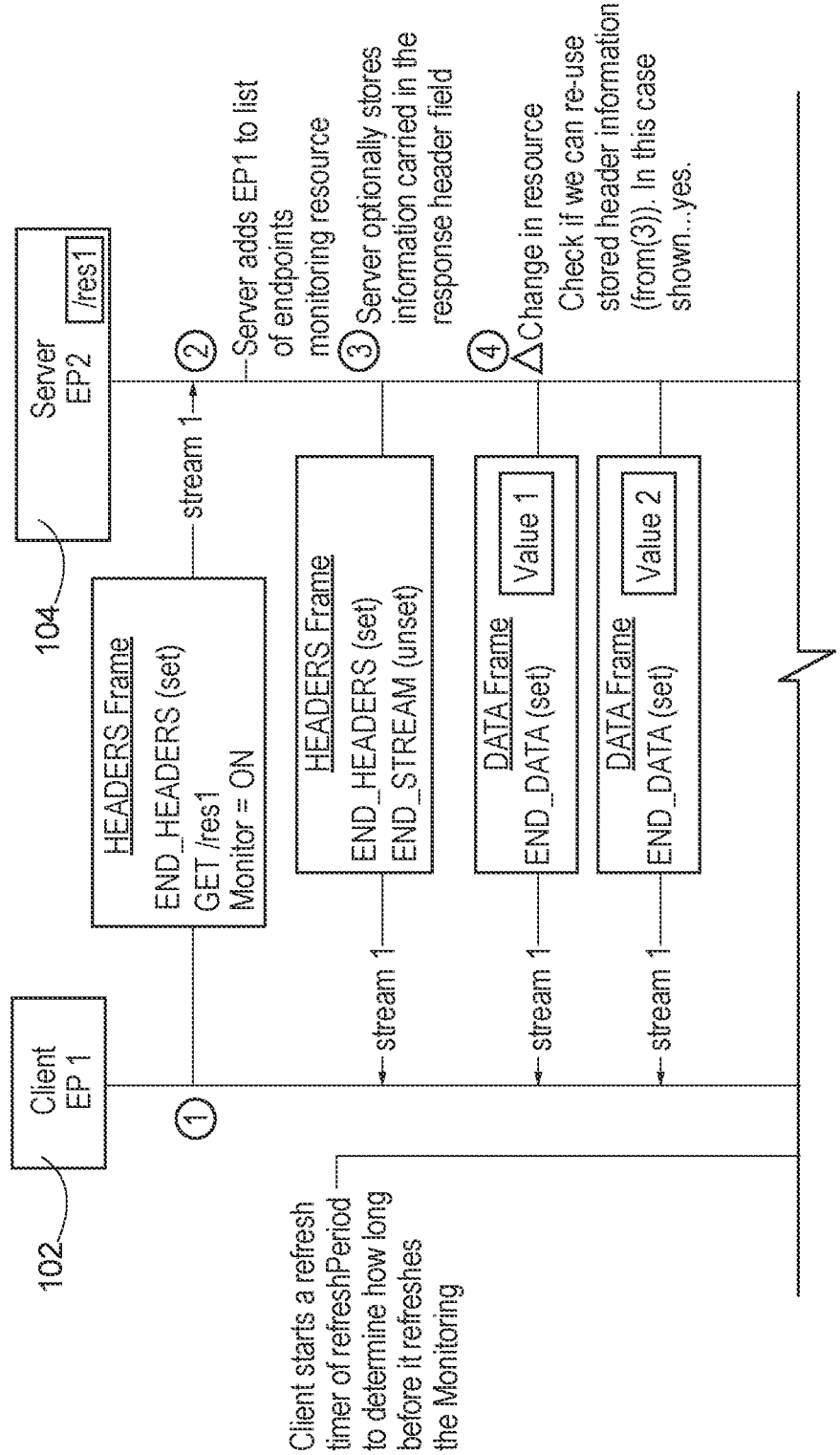
FIG. 18A and FIG. 18B together comprise a flow chart that illustrates a client refreshing monitoring (Solution 1A).
Figure 18B:
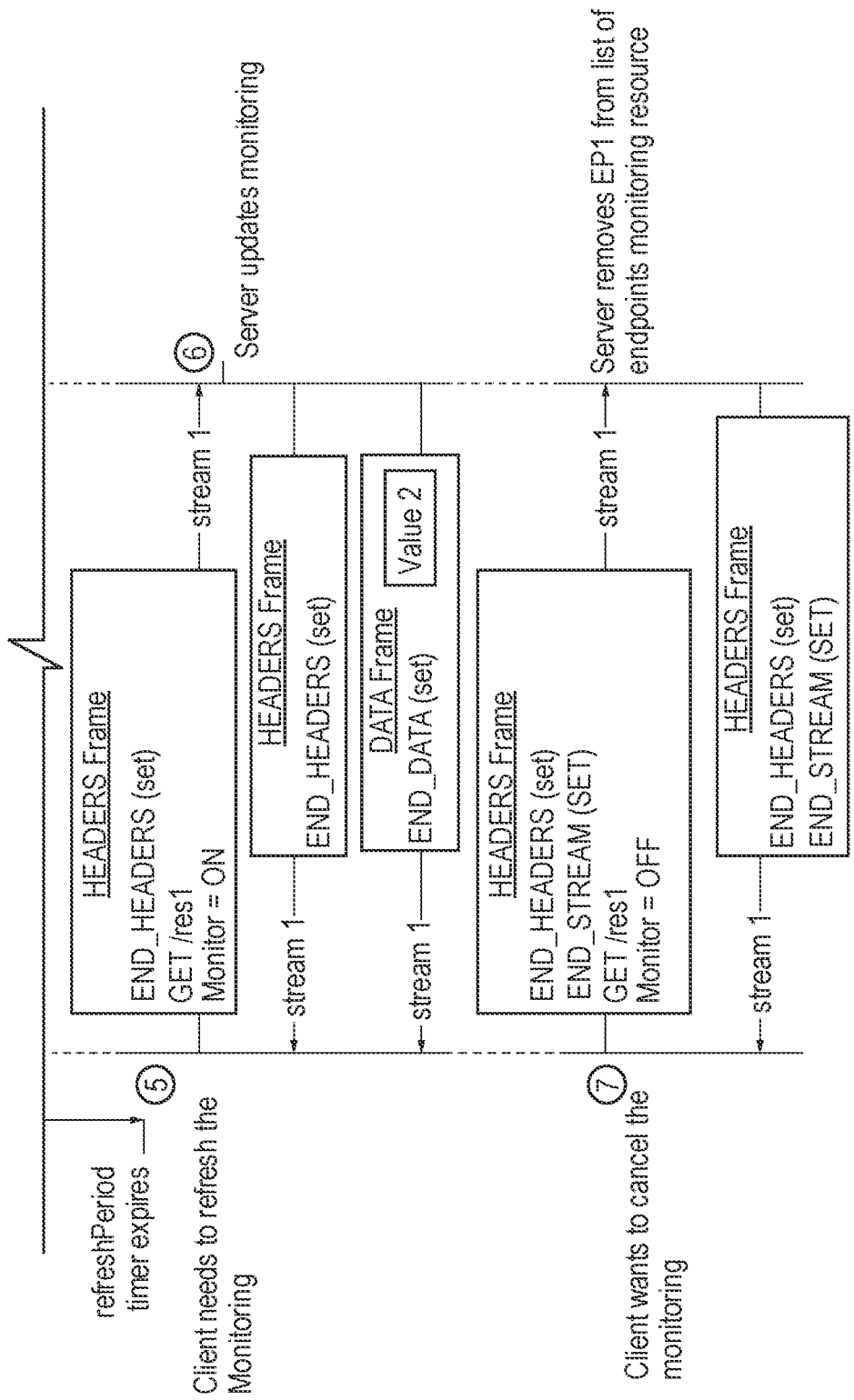

FIGS. 18A and 18B together illustrate a first method in which an application at Client endpoint (EP1) 102 may be interested in monitoring/res1 on Server endpoint (EP2) 104. The Client 102 may need to start a new HTTP/2 connection 802 to the Server 104, if not already available.

In step 1 of FIG. 18A, the client 102 issues the monitoring request on a new stream, using the next available stream identifier (shown as stream1 in FIGS. 18A-B). For example, the Client 102 sends a monitor request for/res1 to Server 104. This may be achieved through a GET request transmitted with a new header field (Monitor) set to ON. This header field may indicate that the GET request is actually a monitor request for the resource. The request may be sent via a HEADERS frame (and zero or more CONTINUATION frames) with:

HEADERS frame having an unset END_STREAMS flag allows the Client 102 to refresh the resource monitoring or to cancel the resource monitoring.

the last frame having a set END_HEADERS flag

Client 102 may start a refresh timer to allow refreshing the monitoring on a new stream. The timer may have a duration of refreshPeriod. Alternatively the new header field may be carried as a new field in the HEADERS frame payload. As another alternative, the monitor request may be signaled in a new MONITOR method, which includes the URI of the resource to be monitored.

In step 2 of FIG. 18A, the Server 104 adds Client 102 to list of endpoints that are monitoring resource (/res1) and stores the stream ID linked to this monitored resource (stream1). As more than one client 102 may be interested in the monitored resource, the list of endpoints referred to above, denotes the clients that are to be notified when there is a change in the monitored resource.

In step 3 of FIG. 18A, the Server 104 issues a response on stream1. The response is sent via a HEADERS frame (zero or more CONTINUATION frames) and a DATA frame. The DATA frame has a new flag (END_DATA) set to 1, to inform the Client 102 that the resource representation is fully contained in the current DATA frame, and that the Server 104 will keep stream1 open for future responses. The Server 104 may optionally include a suggested refresh period in its response to the Client 102. This may allow the Client 102 to better adjust its refresh timer to guarantee that the TCP connection is not terminated by a middlebox. A middle box such as a router, gateway, firewall, etc. may also use Deep Packet Inspection (DPI) to obtain the refresh timer and use the refresh timer to make decisions regarding how long connections may be kept open. The Server 104 may optionally store the information carried in the response header fields.

In step 4 of FIG. 18A, upon the next change in state of resource/res1, the Server 104 sends a new DATA frame to the Client 102 on stream1. The Server 104 may first check if the header information has changed since the last response.

If not, the Server 104 may send a DATA frame on stream1, with END_DATA flag set to 1. This informs the Client 102 that the resource representation is fully contained in the current DATA frame and that the header fields are identical to those carried in the last response message. This is the option shown in the figure. Otherwise, the Server 104 may send a new HEADERS frame with each response (this option is not shown in the figure). In such a case, since the client 102 is monitoring a resource on stream1, it should not treat the reception of this HEADERS frame as a protocol error. Upon reception of a DATA frame (or HEADERS, CONTINUATION, and DATA frame) the Client 102 uses the stream ID to cross reference the response to the monitor request.

In step 5 of FIG. 18B, the refresh timer expires. The Client 102 refreshes the monitoring of/res1, by issuing a new monitor request on the existing stream (stream1 shown in FIGS. 18A-B). This may be achieved through a GET request transmitted with new header field (Monitor) set to ON.

In step 6 of FIG. 18B, upon reception of the request to refresh the monitoring, the Server 104 updates the monitoring. Server 104 may optionally send a resource representation of the monitored resource in a DATA frame.

The method may repeat steps 4-6 of FIGS. 18A-B for each change in monitored resource, until the client cancels its monitoring request (step 7).

In step 7 of FIG. 18B, the Client 102 issues a request message to cancel the monitoring of/res1. This may be achieved through a GET request transmitted with new header field (Monitor) set to OFF. Server 104 removes the Client 102 from the list of endpoints that are monitoring resource/res1.

Note that the refresh timer should be set to a value that ensures that most middleboxes will not terminate the TCP connection abruptly and break the HTTP/2 connection 802. Ideally this value should be set based on current best practices. Typical values used for HTTP long polling are likely acceptable for the solution discussed above: namely 30 sec to 120 sec (RFC 6202, Known Issues and Best Practices for the Use of Long Polling and Streaming in Bidirectional HTTP).

Furthermore note that in the above description, a typical call flow of the solution is presented. Various alternatives are possible for a number of the highlighted steps.

For example, it may be assumed that a single monitor request is allowed per stream. If multiple monitor requests from a Client 102 are allowed per stream, the Client 102 needs a mechanism to associate the monitored response to the correct monitored request. This can be achieved by assigning a unique Monitor Request ID to each monitor request that is accepted by Server 104. The Monitor Request ID is provided to the Client 102 in the initial response to the monitor request (Step 3 of FIG. 18A). The Client 102 may then use the stream ID and Monitor Request ID to determine the request that triggered the monitored response. Alternatively the Monitor Request ID may be provided to the Server 104 by the client 102. The Server 104 may then provide the same Request ID to the Client 102 in responses to the monitor request (Step 3 of FIG. 18A).

It may be also assumed that the refresh timer is independent of activity. It is started (or restarted) when the Client 102 issues (or refreshes) a monitor request. Alternatively, the timer may be an inactivity timer, and may be restarted every time there is a message exchange between the endpoints (either a message transmission to the Server 104 or a message reception from the Server 104).

Figure 1A:
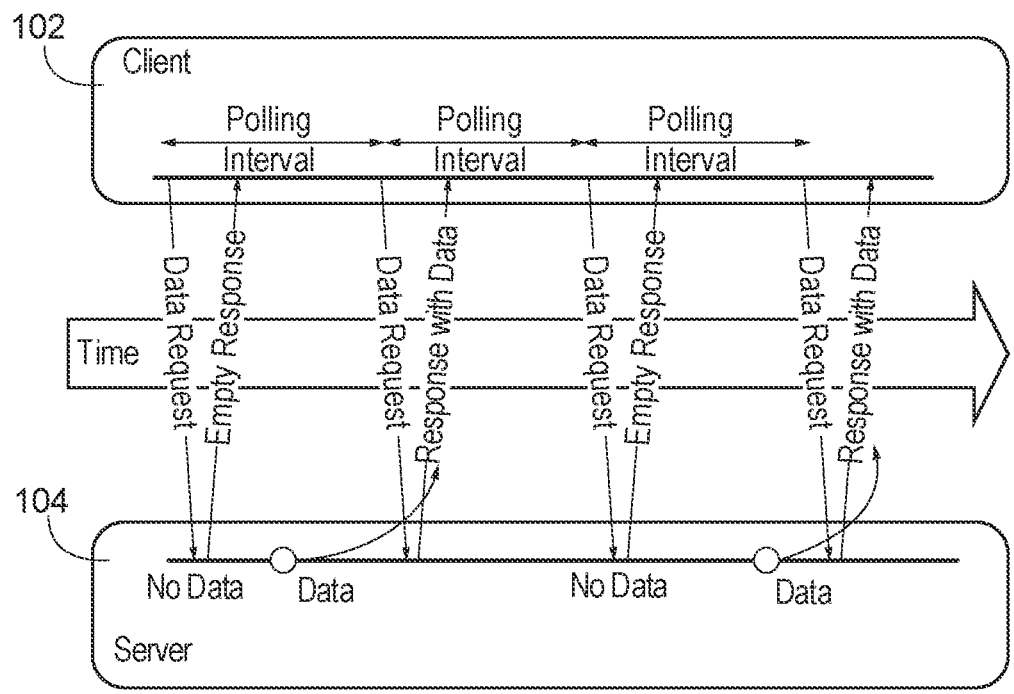
FIG. 1A is a diagram that illustrates HTTP Polling.
Figure 1B:
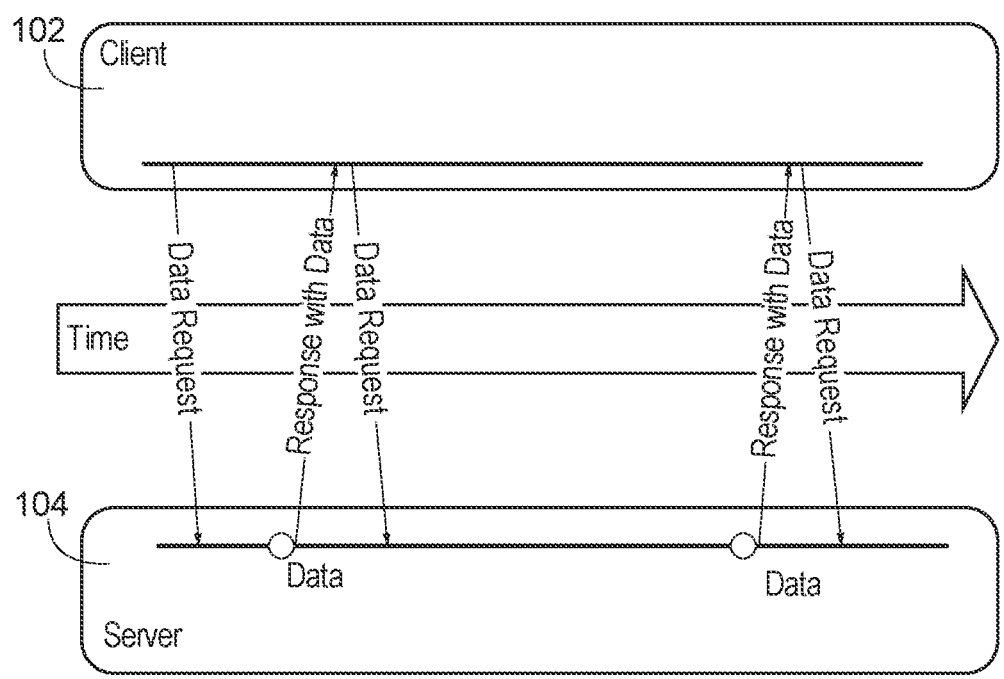
FIG. 1B is another diagram illustrating HTTP Polling.
Figure 2:
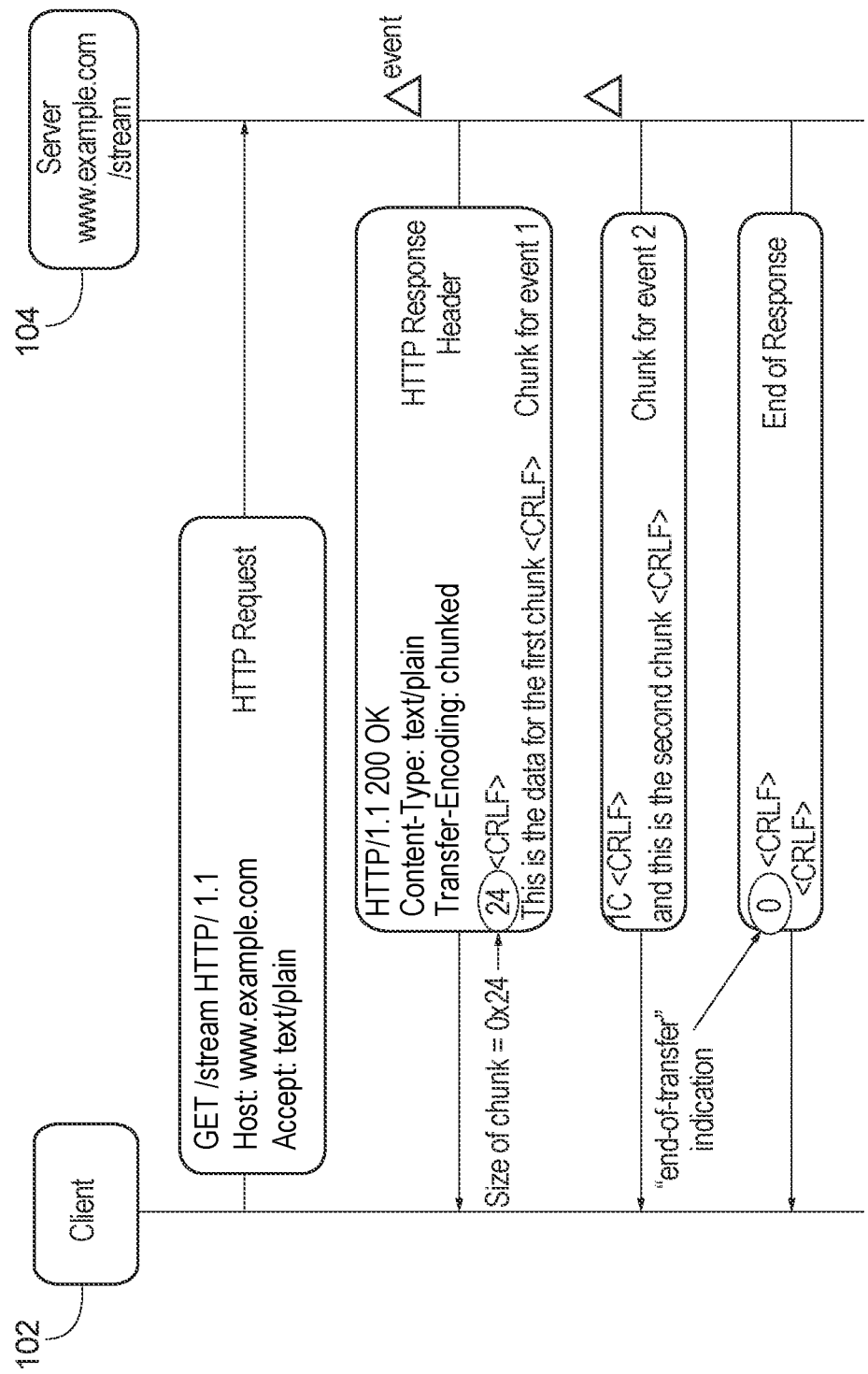
FIG. 2 is a flow chart that illustrates chunked transfer with HTTP streaming.
Figure 3:
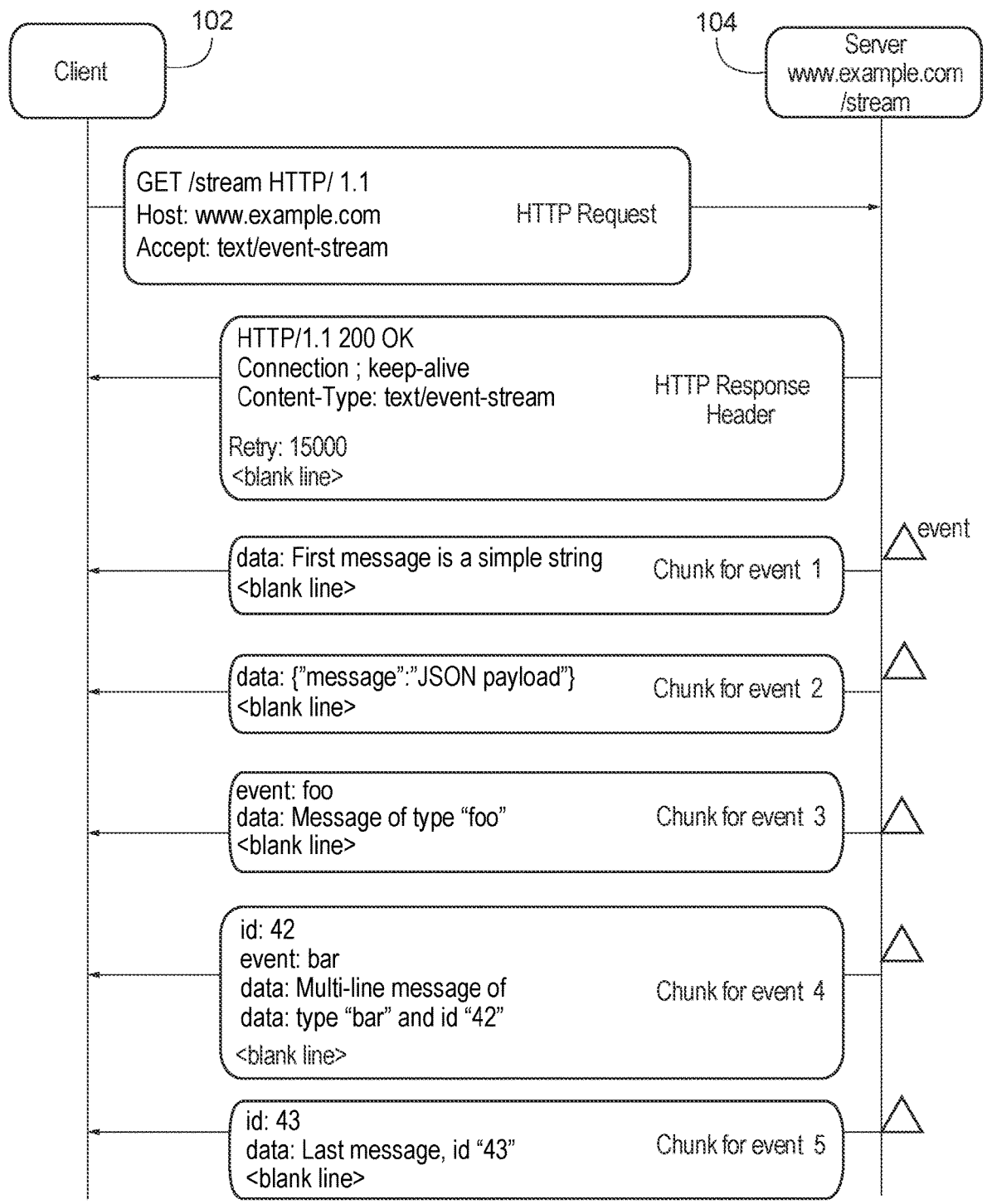
FIG. 3 is a flow chart that illustrates server sent events with HTTP streaming.
Figure 4:
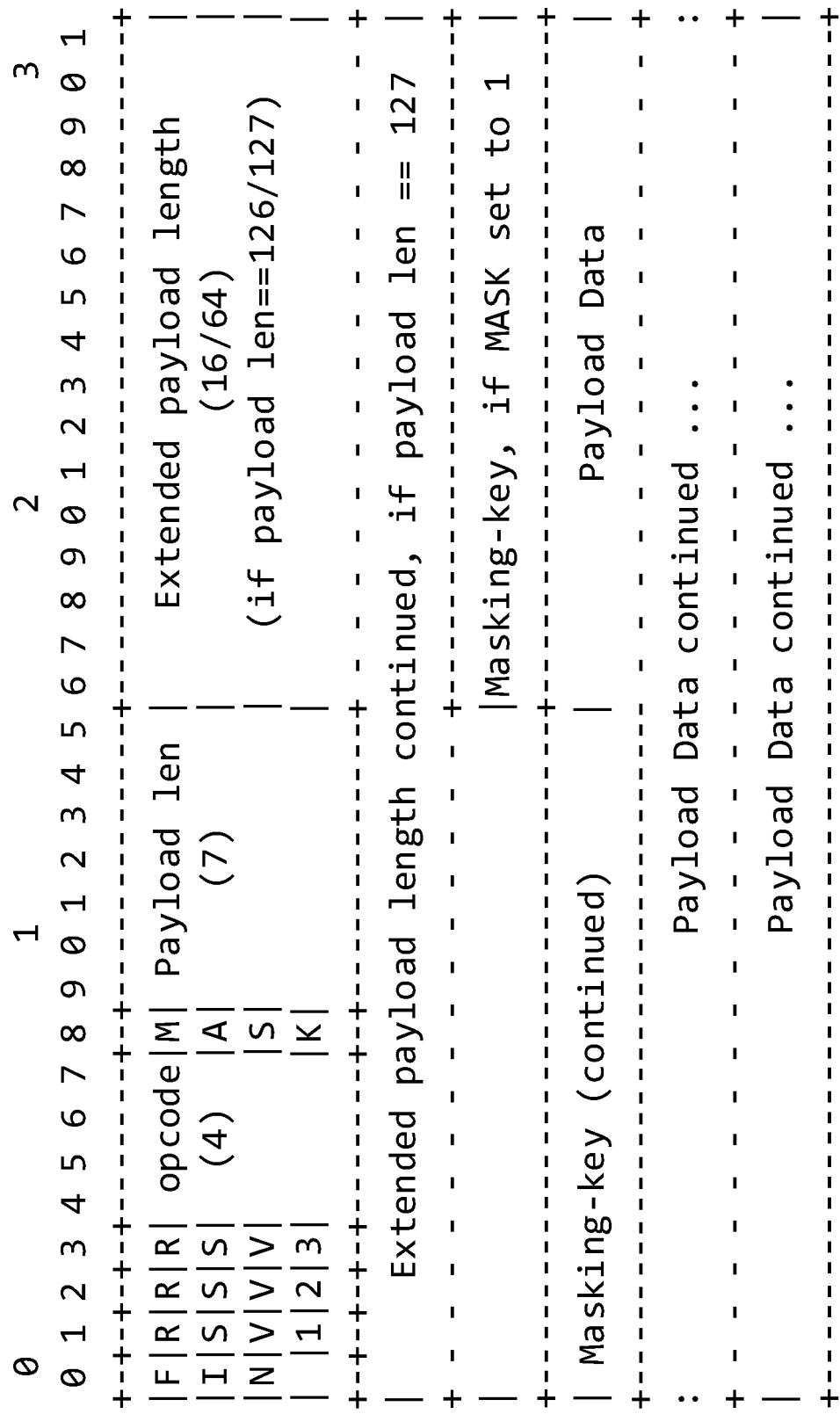
FIG. 4 is a diagram that illustrates a WebSocket frame.
Figure 5:
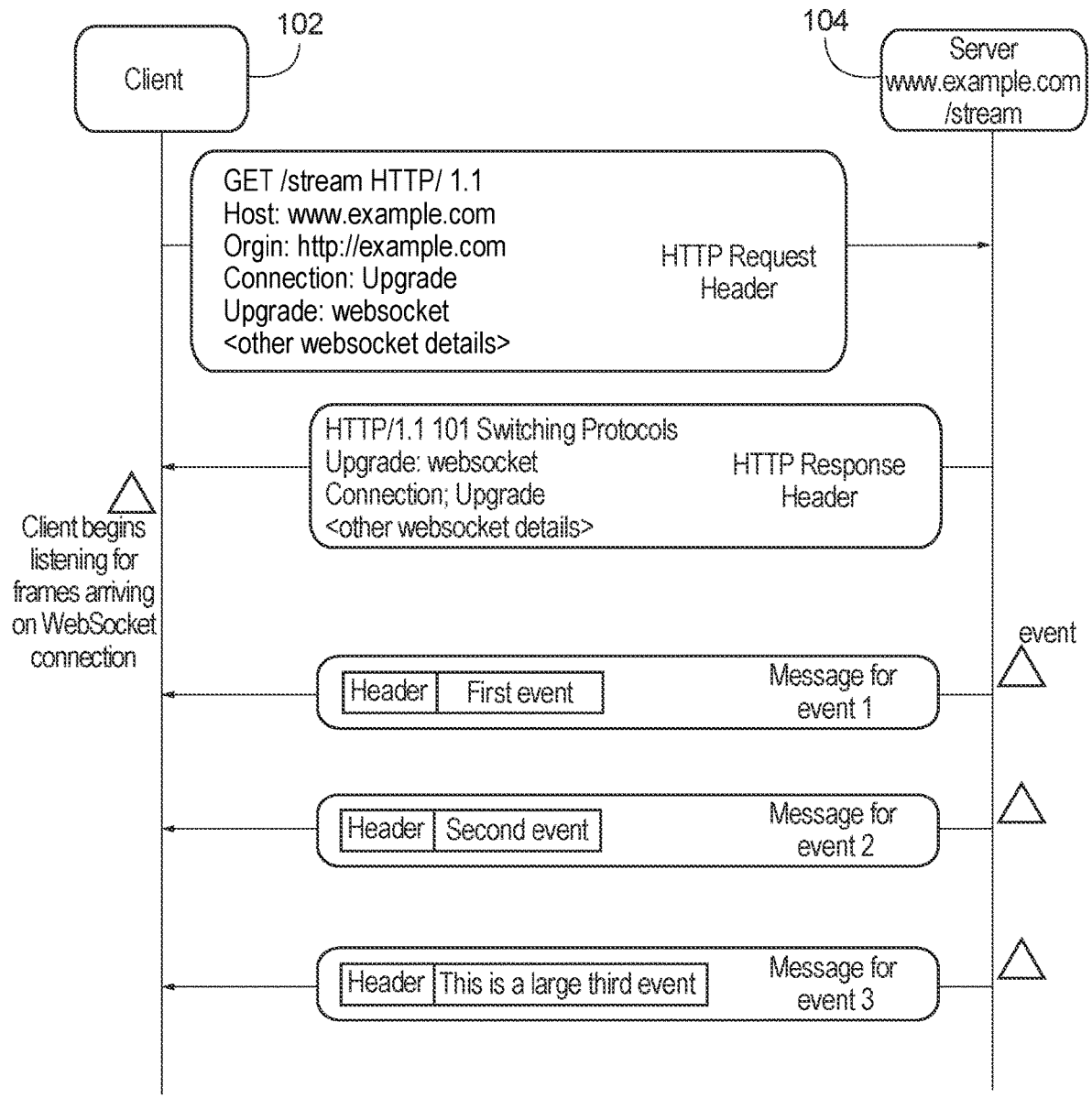
FIG. 5 is a flow chart that illustrates WebSocket example.
Figure 6:
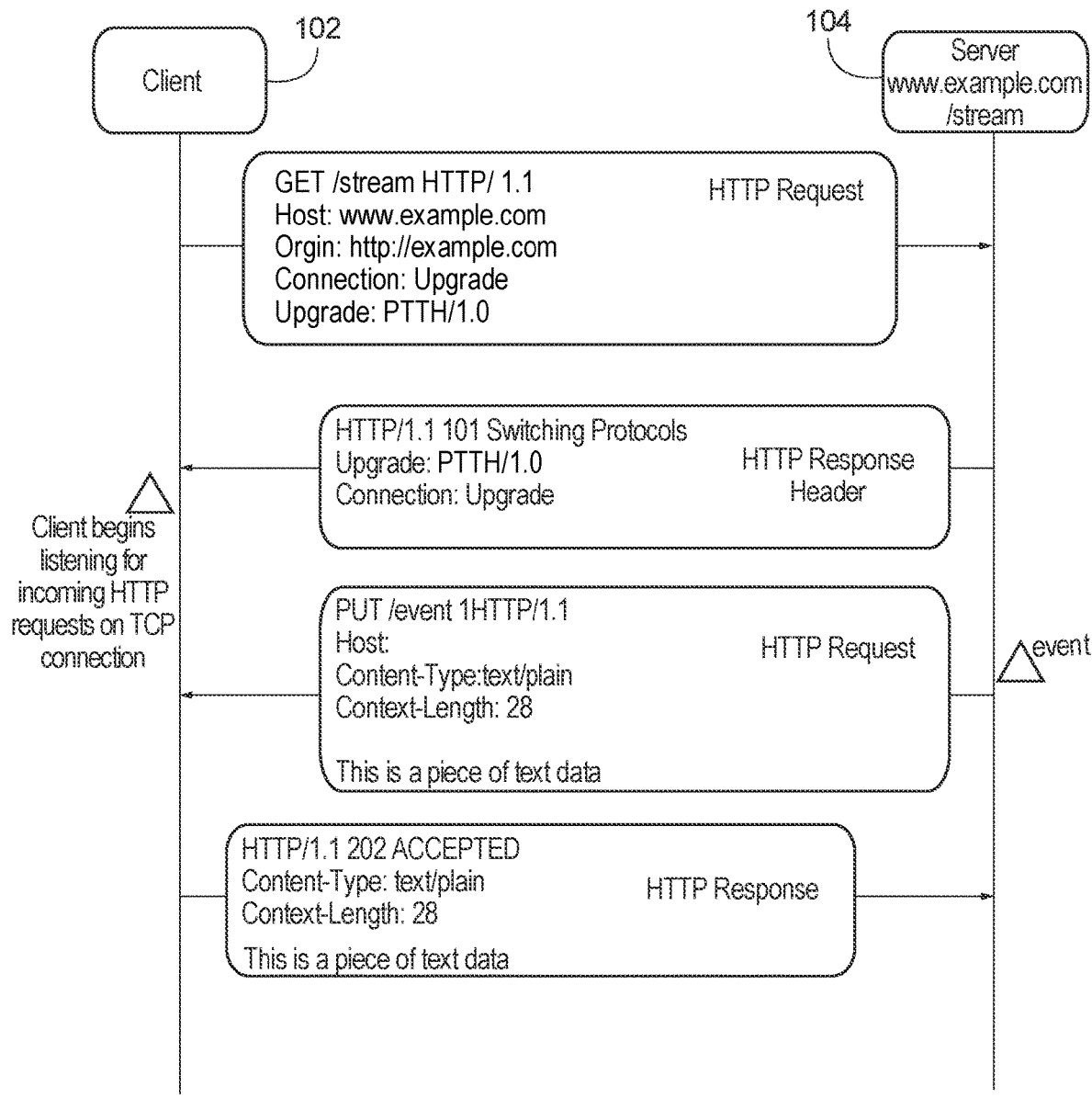
FIG. 6 is a flow chart that illustrates a reverse HTTP example.
Figure 7A:
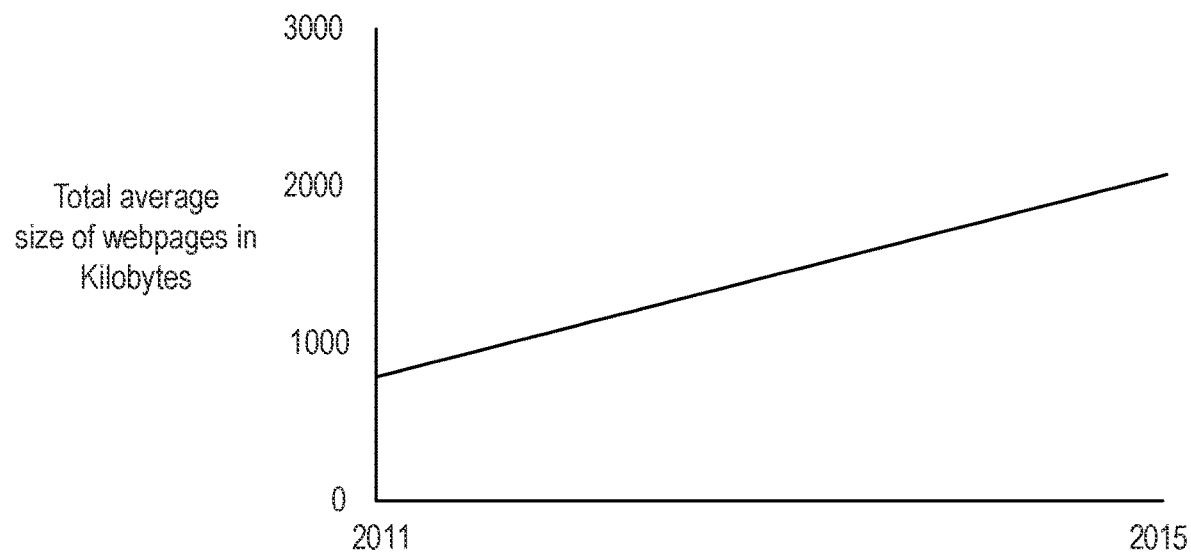
FIG. 7A is a graph that illustrates the rise in total average size of webpages in kilobytes.
Figure 7B:
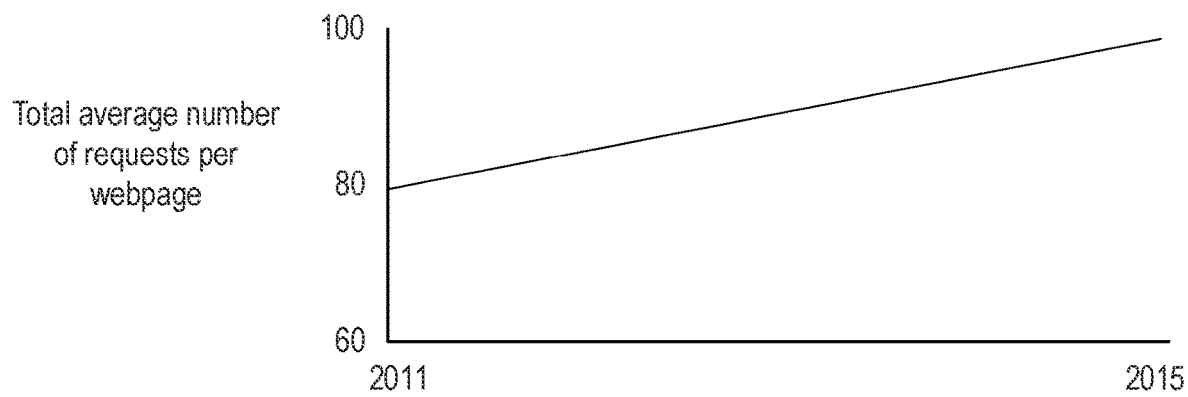
FIG. 7B is a graph that illustrates the rise in the total average number of requests per webpage.
Figure 8:
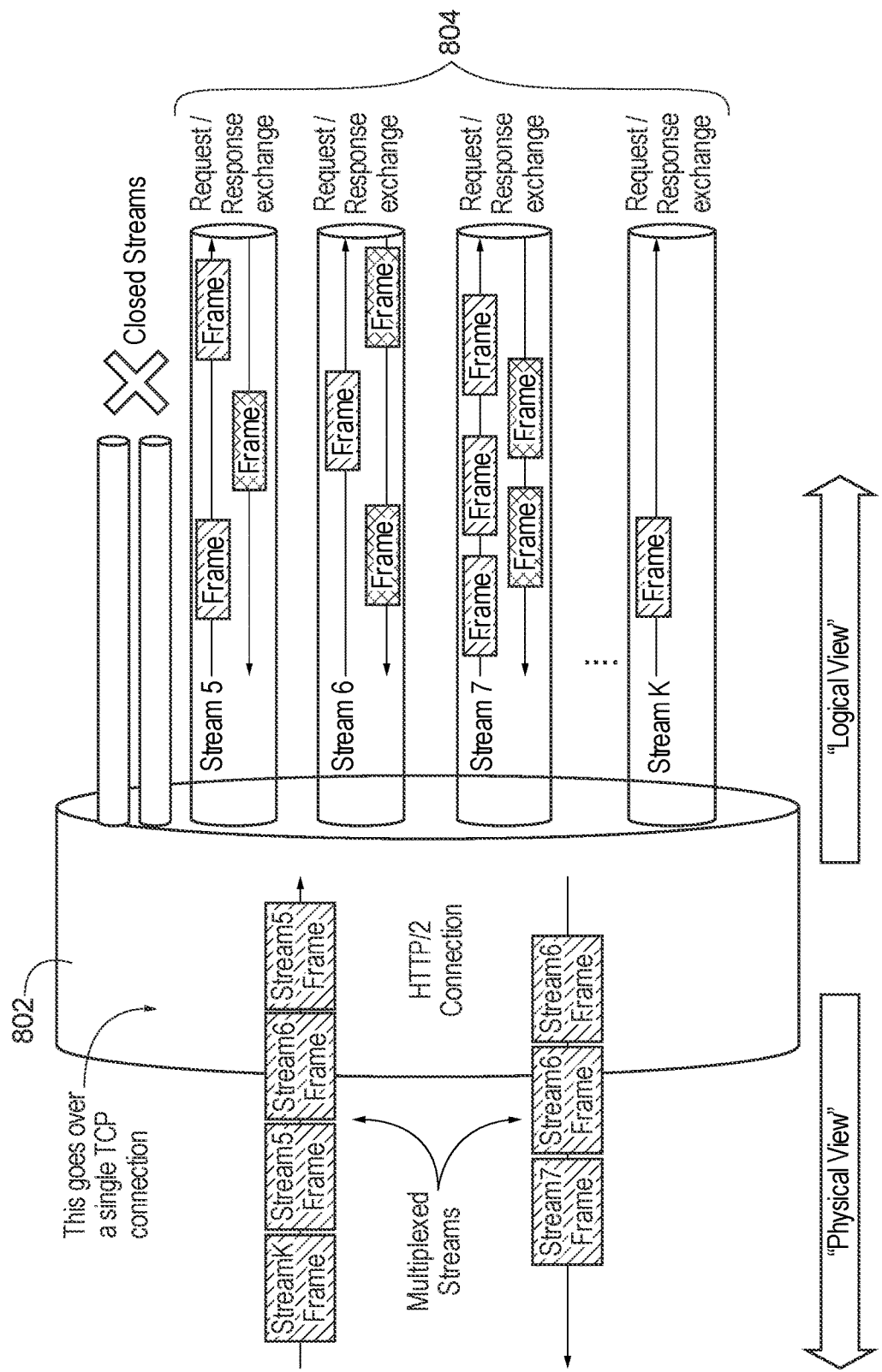
FIG. 8 is a diagram that illustrates an HTTP/2 connection.
Figure 9:
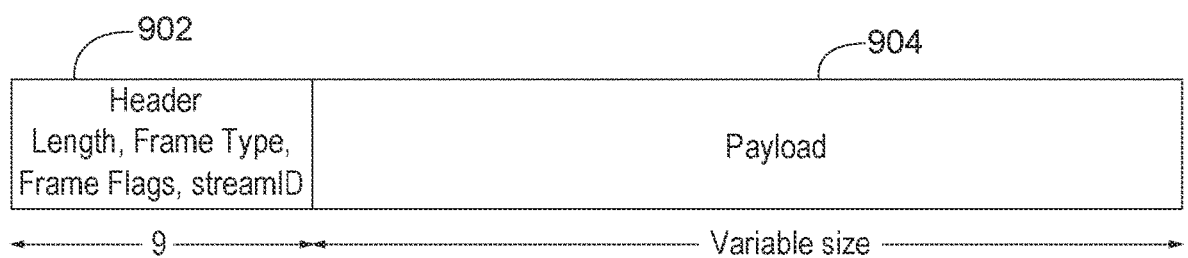
FIG. 9 is a diagram of an HTTP/2 frame.
Figure 10A:
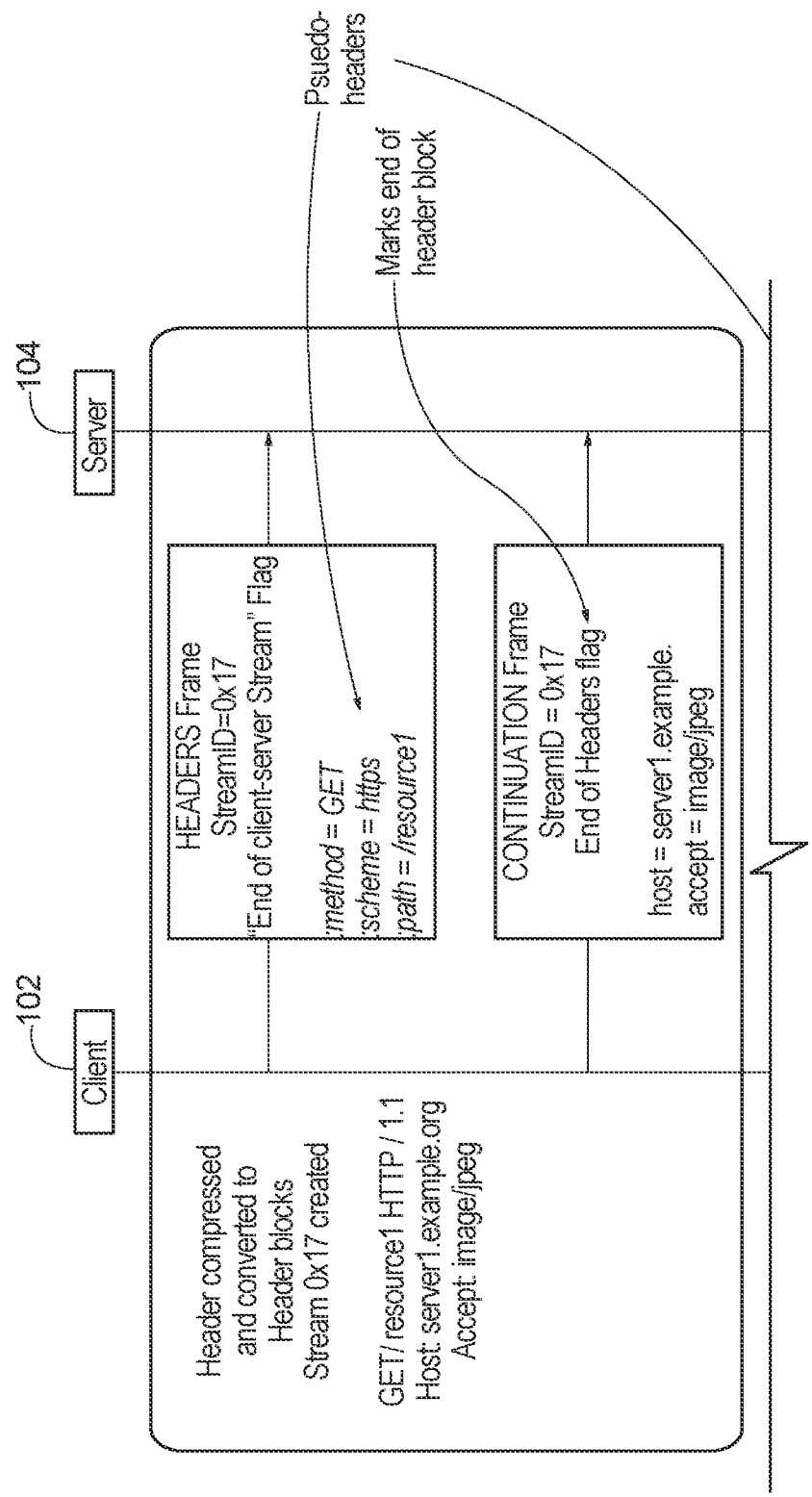
FIG. 10A and FIG. 10B together comprise a flow chart that illustrates an HTTP/2 request/response exchange.
Figure 10B:
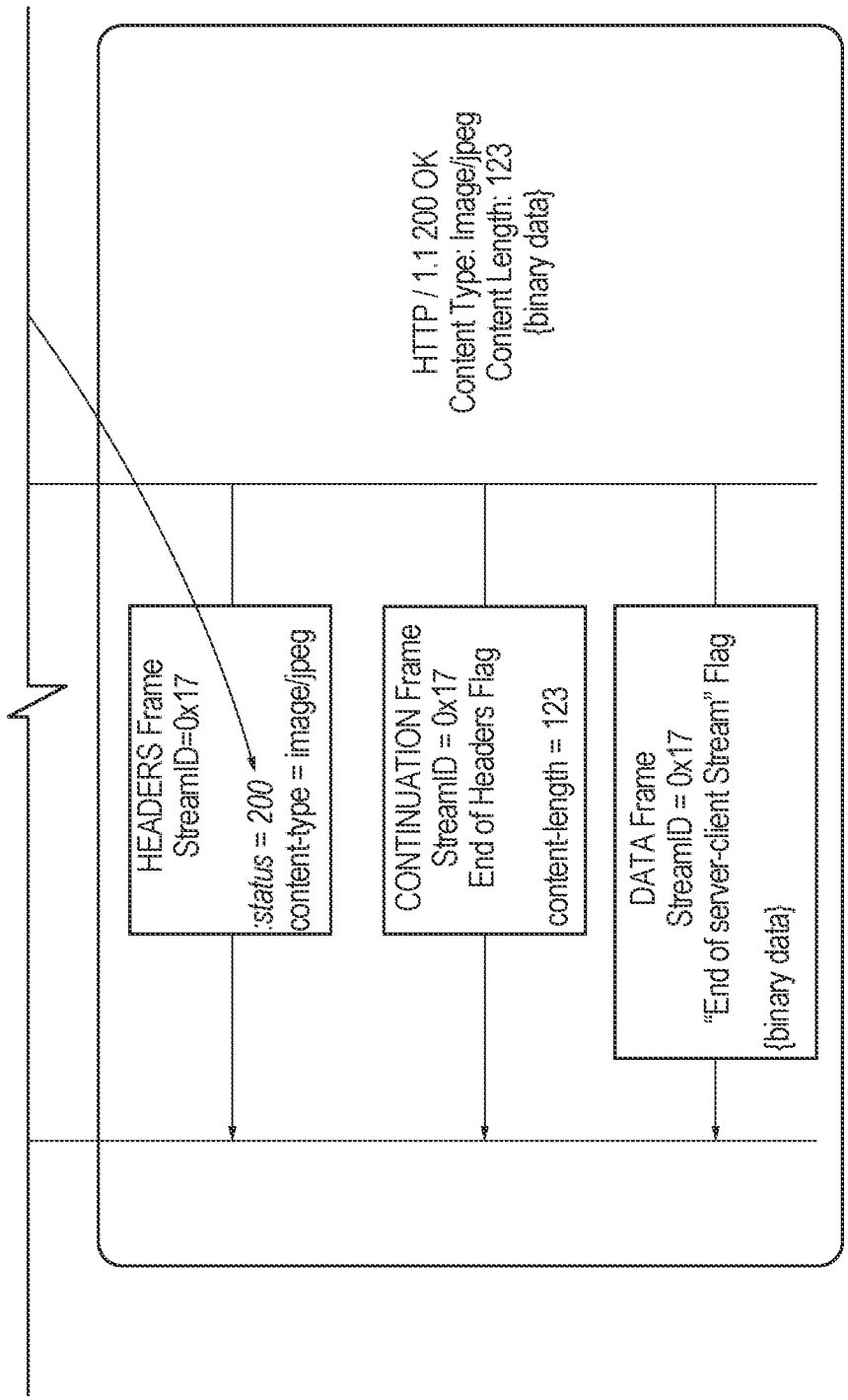
Figure 11:
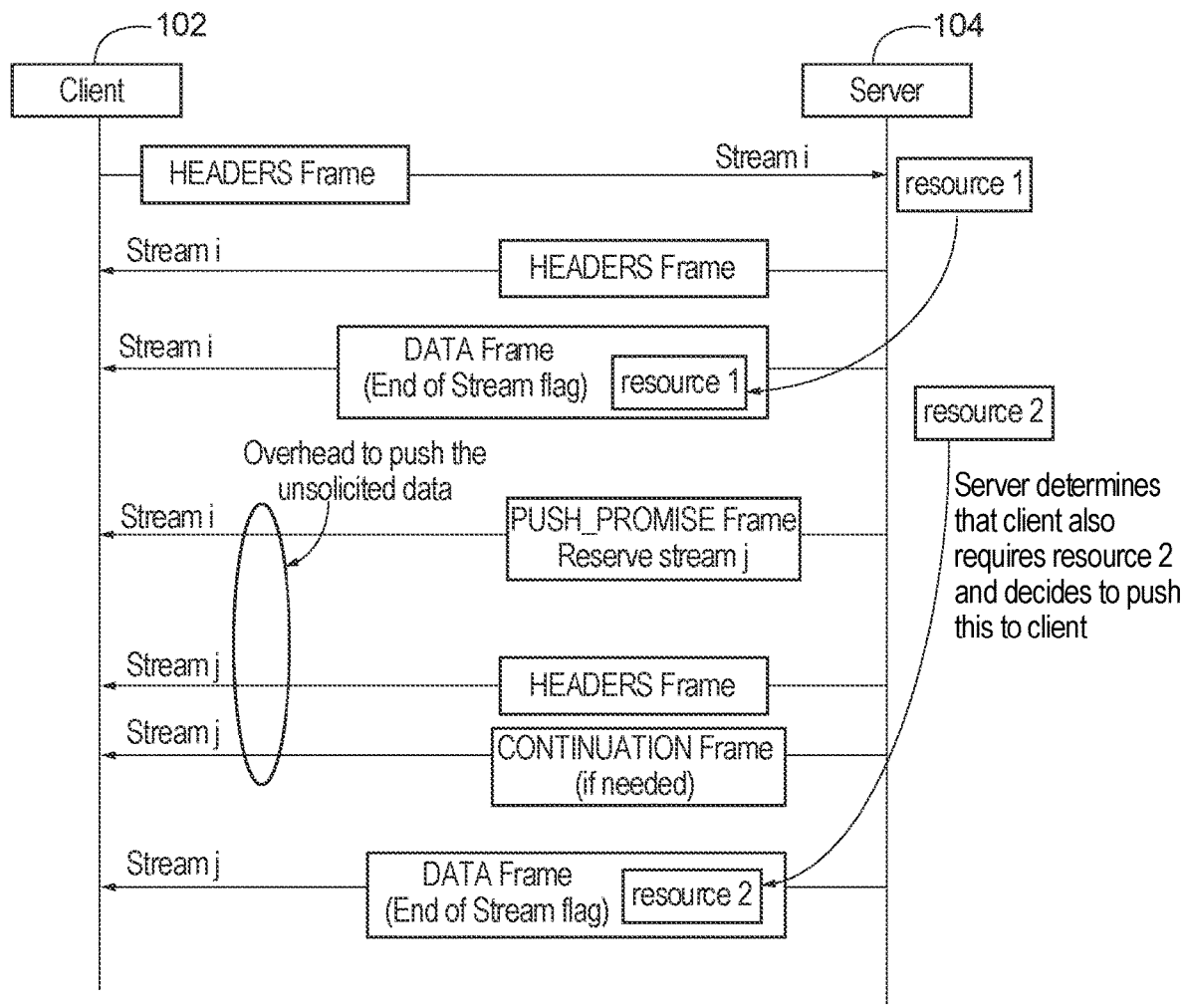
FIG. 11 is a flow chart that illustrates an HTTP/2 PUSH_PROMISE exchange.
Figure 12:
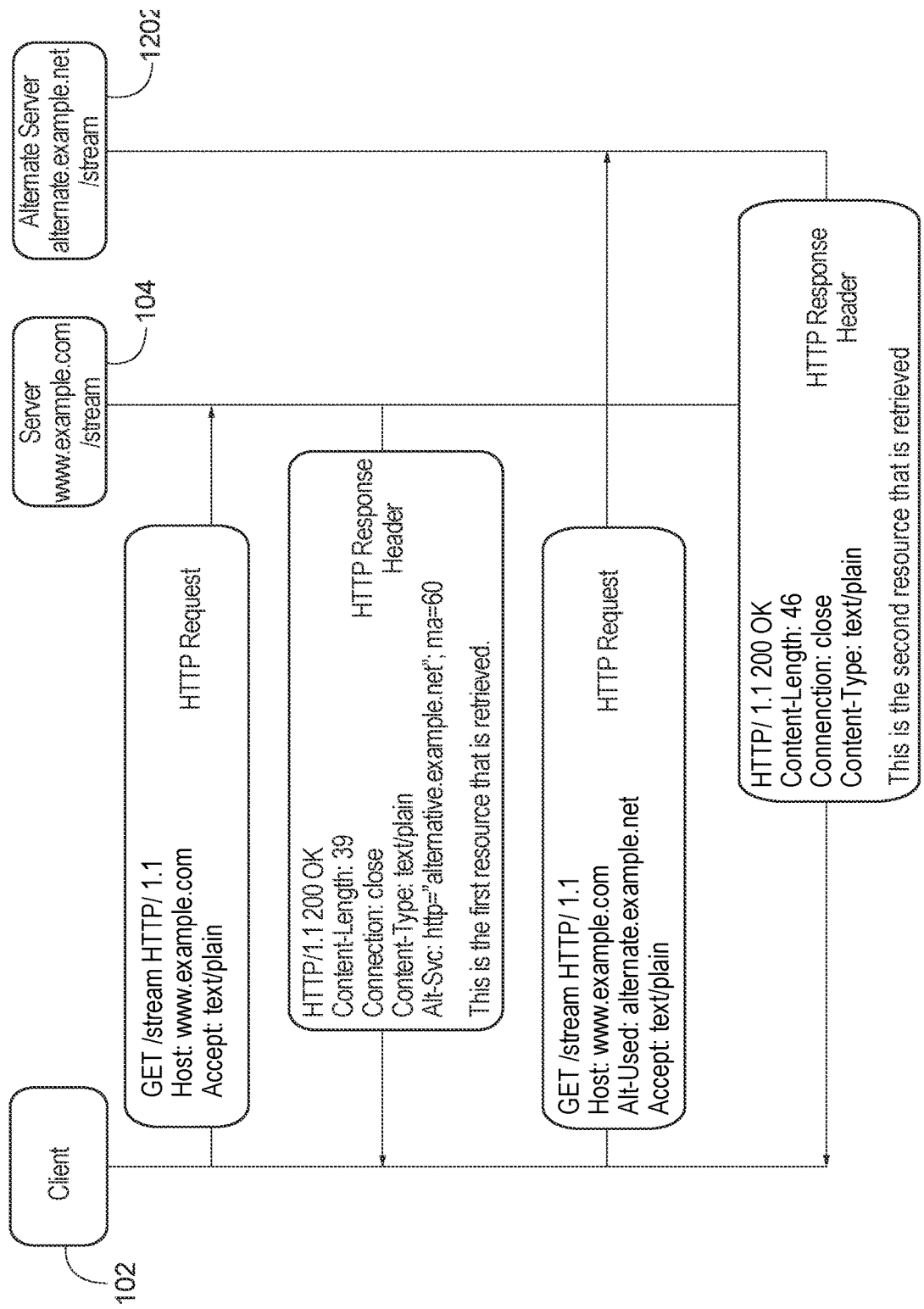
FIG. 12 is a diagram of HTTP alternative services.
Figure 13:
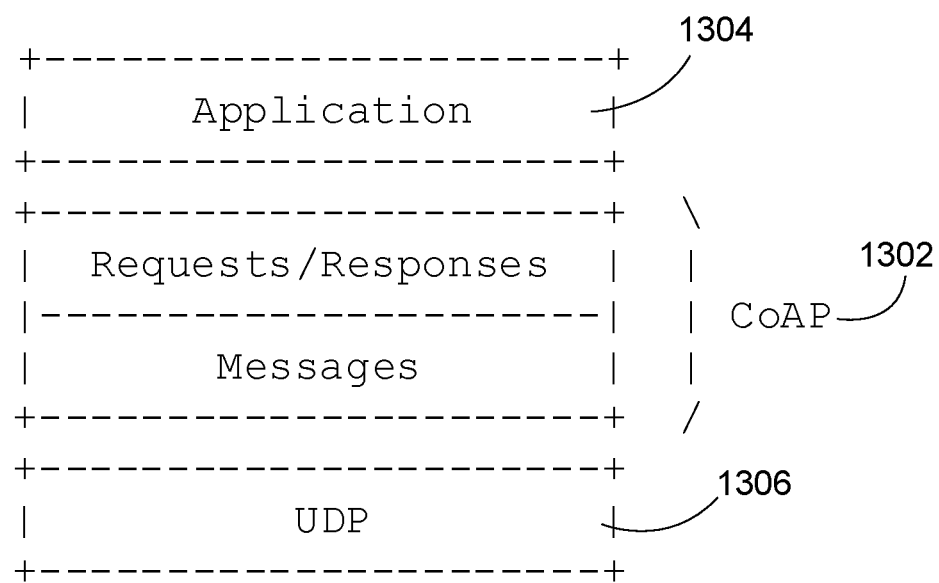
FIG. 13 is a diagram of abstract layering of CoAP.
Figure 14:
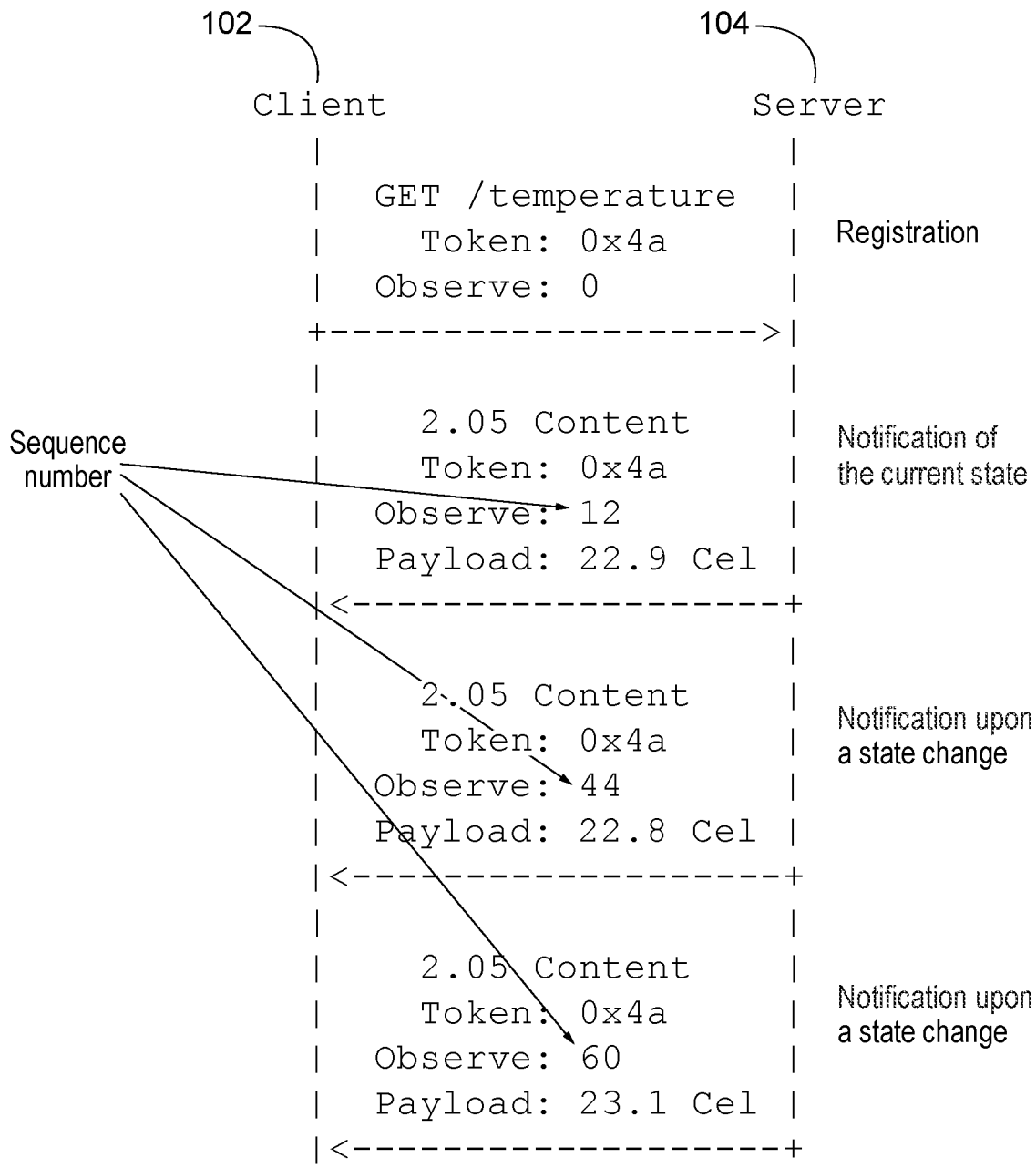
FIG. 14 is a flow chart that illustrates CoAP Observe.

It may further be assumed that refreshed monitor requests are always issued on the current stream that is handling the monitoring. Alternatively, the Client 102 may refresh the monitoring of/res1, by issuing a new monitor request on a new stream (for instance using stream3 instead of stream1 in FIG. 5). The new stream may be created following the HTTP/2 rules. This may be achieved through a GET request transmitted with new header field (Monitor) set to ON. Note that this may result in the creation of a new HTTP/2 connection 802 if no more streams 804 can be allocated in the current HTTP/2 connection 802, for example, due to the endpoint exhausting its available range of stream identifiers (that is SETTINGS_MAX_CONCURRENT_STREAMS is met). This prevents keeping HTTP/2 connections open to satisfy very long-lived monitoring requests.

The refreshed monitoring may also need to close the old stream (stream1). For example, it may include a new DELETE_STREAM field in the request HEADERS frame. The DELETE_STREAM denotes the old stream number that is to be closed (stream1). Alternatively, after the new monitor request, the client 102 may send a RST_STREAM frame on the old stream (stream1).

The Client 102 may then link the new stream ID (stream3) to the initial monitoring request. The linking allows the HTTP application layer at the Client 102 to decide that a received response is actually a monitor response to its original monitor request that was issued on stream 1. Client 102 may also restart the refresh timer.

Upon reception of the request to refresh the monitoring, the Server 104 may update the stream ID linked to this monitored resource (from old stream (stream1) to the new stream (stream3)). It may send a response to the Client 102 to acknowledge the closing of stream1 (using the new DELETE_STREAM field in the HEADERS frame).

As an alternative to using a GET request to refresh the monitoring, the client 102 may use the existing HTTP/2 PING mechanism to keep the HTTP/2 connection 802 alive. The PING frame would be sent on stream 0.

It may further be assumed that the monitor request is only cancelled by the Client 102. Alternatively, a Server 104 may also cancel a monitor request. For instance, the Server 104 may send a RST_STREAM frame on the current stream, which notifies the Client 102 to cancel the monitoring.

Figure 24A:
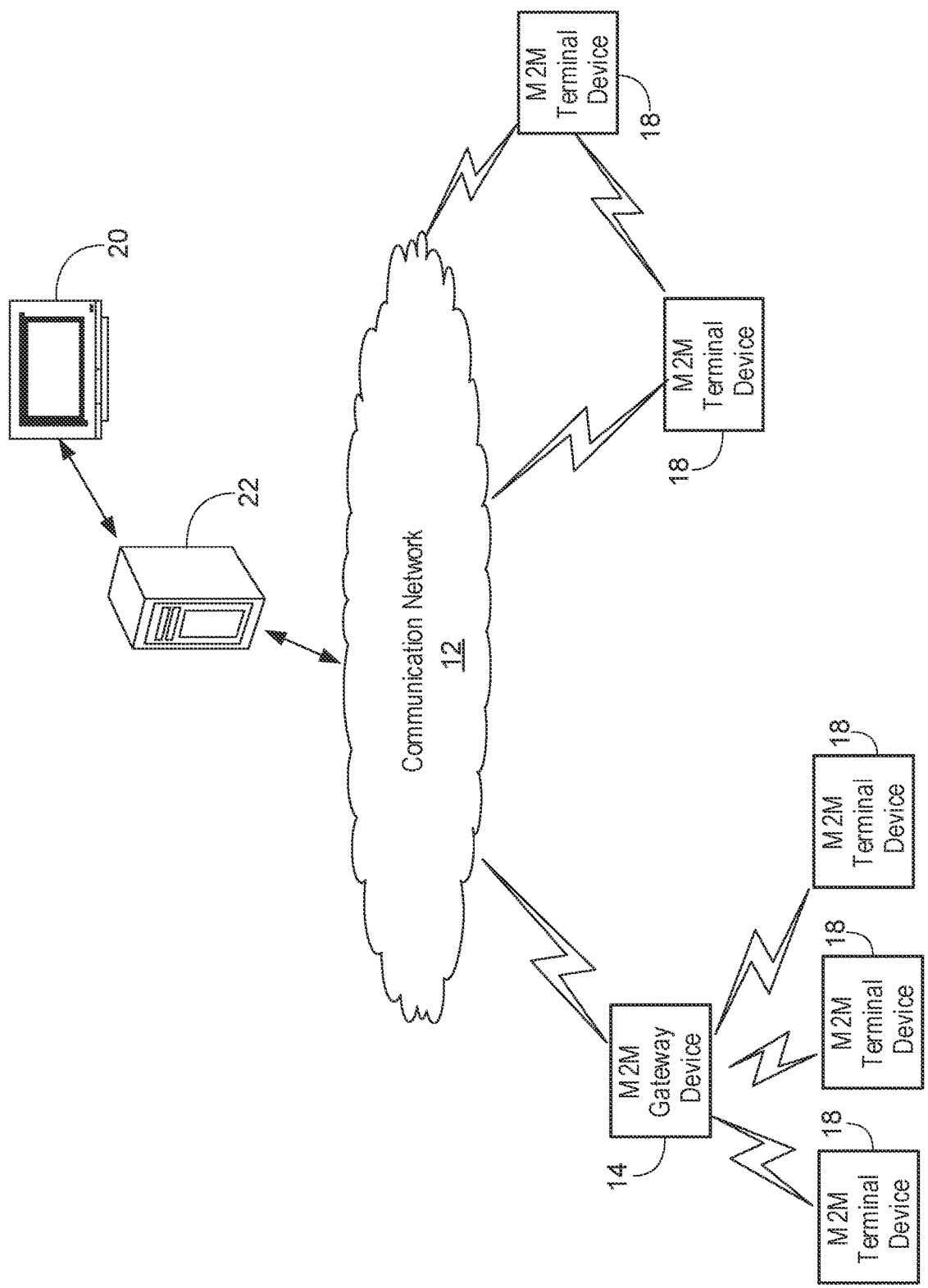
FIG. 24A is a diagram of a M2M/IoT/WoT communication system that includes a communication network.
Figure 24B:
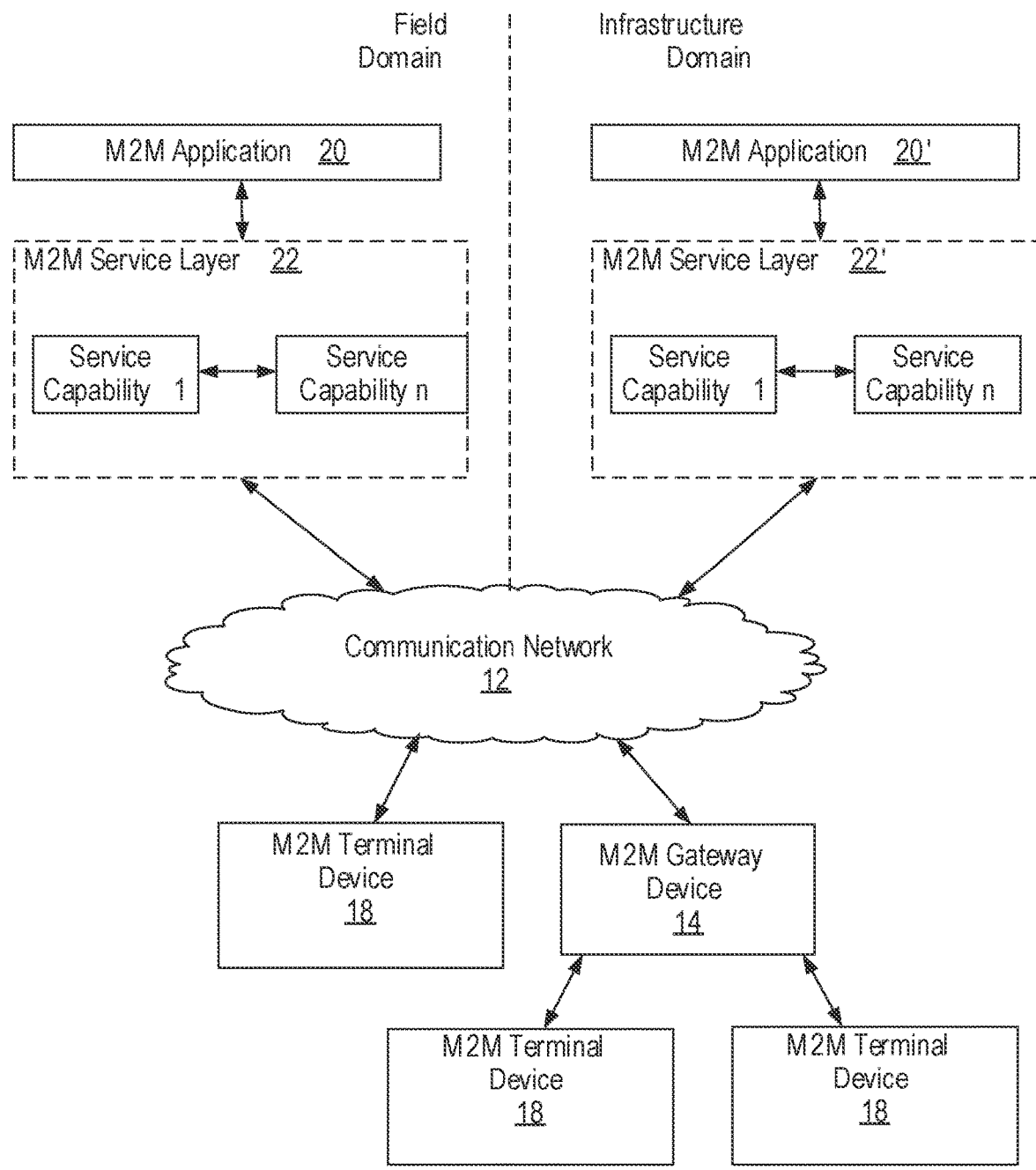
FIG. 24B is a diagram of an illustrated M2M service layer in the field domain that provides services for the M2M application, M2M gateway devices, and M2M terminal devices and the communication network.
Figure 24C:
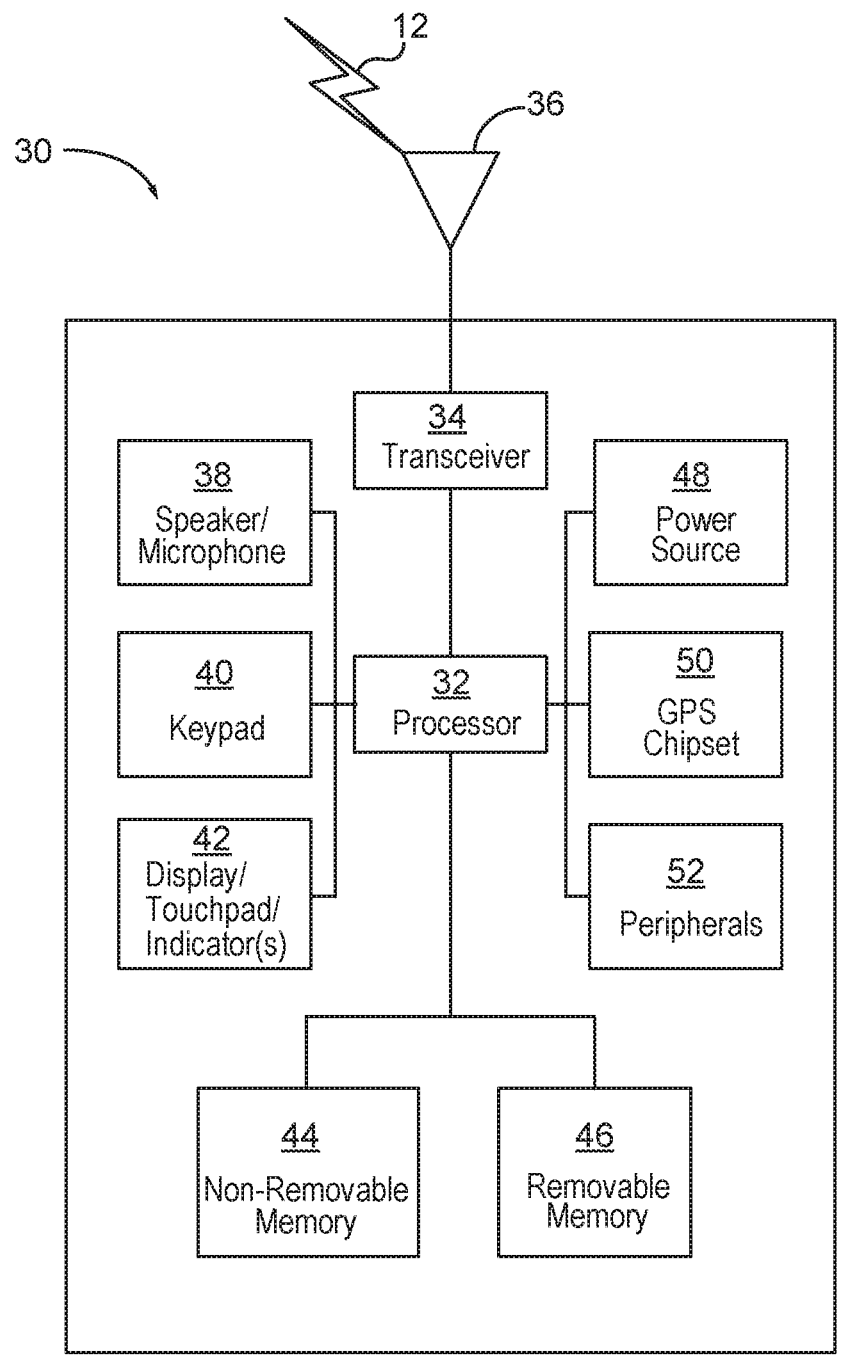
FIG. 24C is a diagram of an exemplary device that may be used to implement any of the network nodes, devices or apparatuses described herein.
Figure 24D:
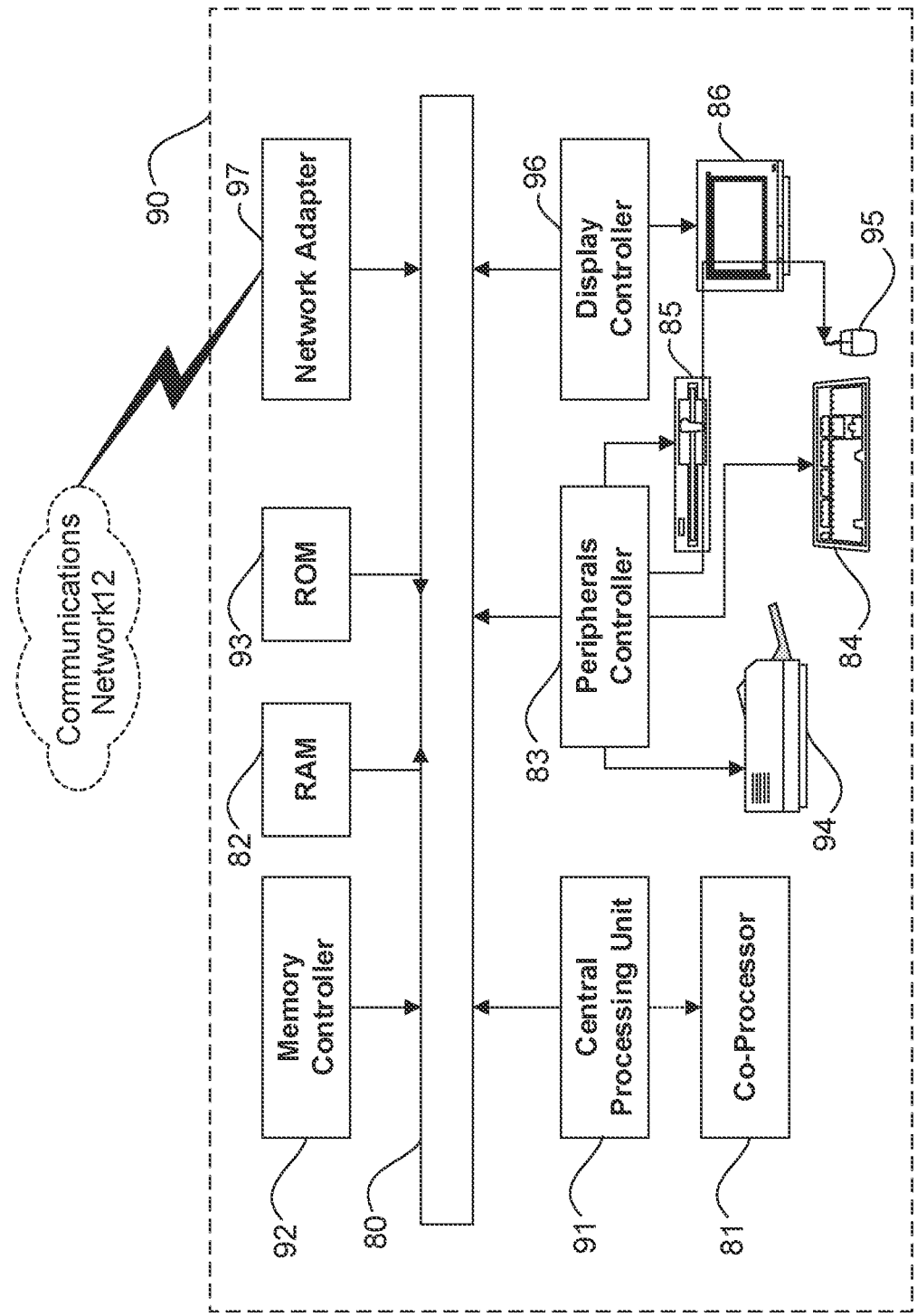
FIG. 24D is a block diagram of a computer system or server that may be used to implement any of the network nodes, devices or apparatuses described herein.

It is understood that the entities performing the steps illustrated in FIGS. 18A-B may be logical entities that may be implemented in the form of software (i.e., computer-executable instructions) stored in a memory of, and executing on a processor of, a network apparatus or computer system such as those illustrated in FIG. 24C or FIG. 24D. That is, the method(s) illustrated in FIGS. 18A-B may be implemented in the form of software (i.e., computer-executable instructions) stored in a memory of a network apparatus, such as the apparatus or computer system illustrated in FIG. 24C or FIG. 24D, which computer executable instructions, when executed by a processor of the apparatus, perform the steps illustrated in FIGS. 18A-B. It is also understood that any transmitting and receiving steps illustrated in FIGS. 18A-B may be performed by communication circuitry of the apparatus under control of the processor of the apparatus and the computer-executable instructions (e.g., software) that it executes.

Method 1B: Server Refreshes Monitoring

Figure 19A:
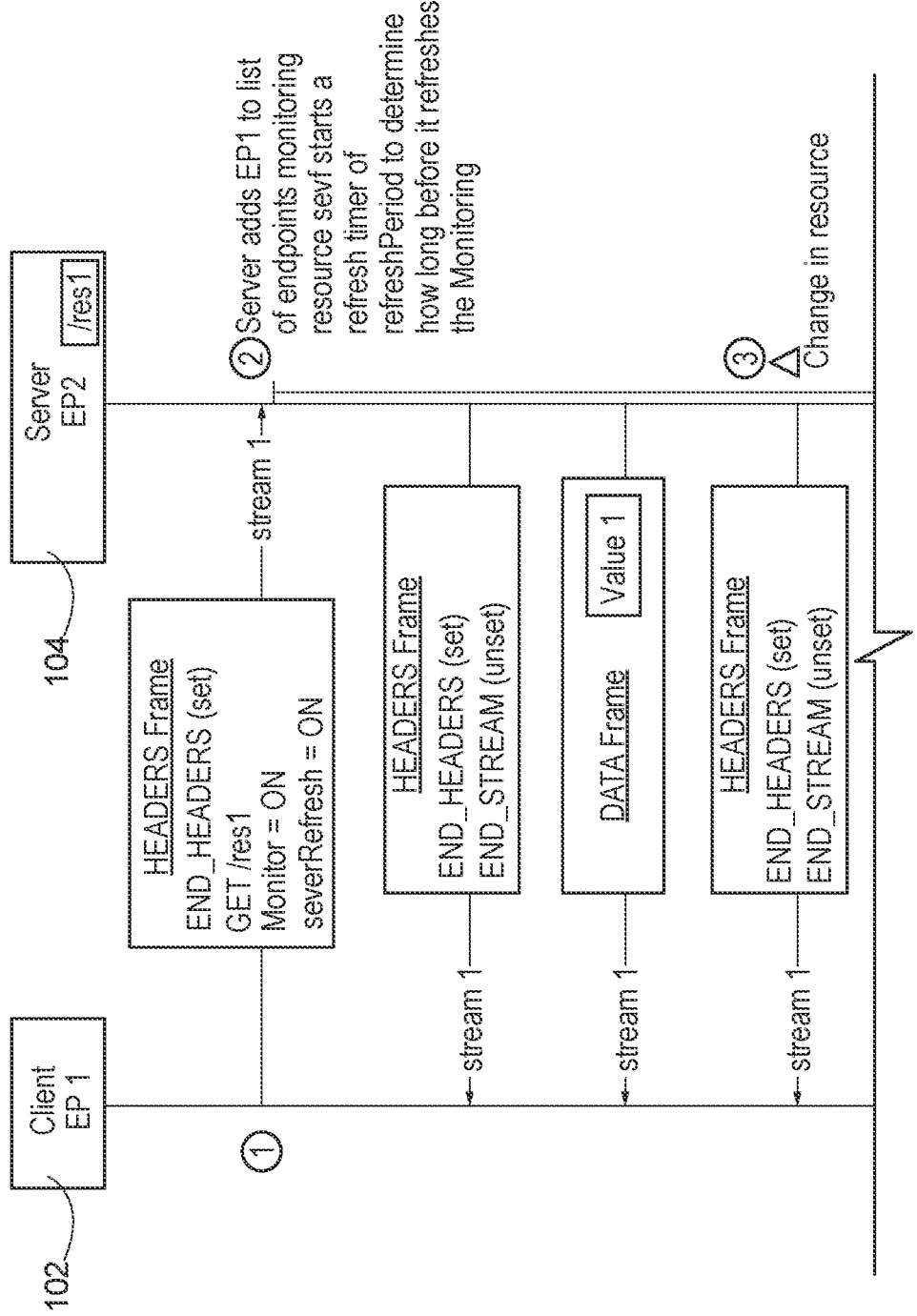
FIG. 19A and FIG. 19B together comprise a flow chart that illustrates a server refreshing monitoring (Solution 1B).
Figure 19B:
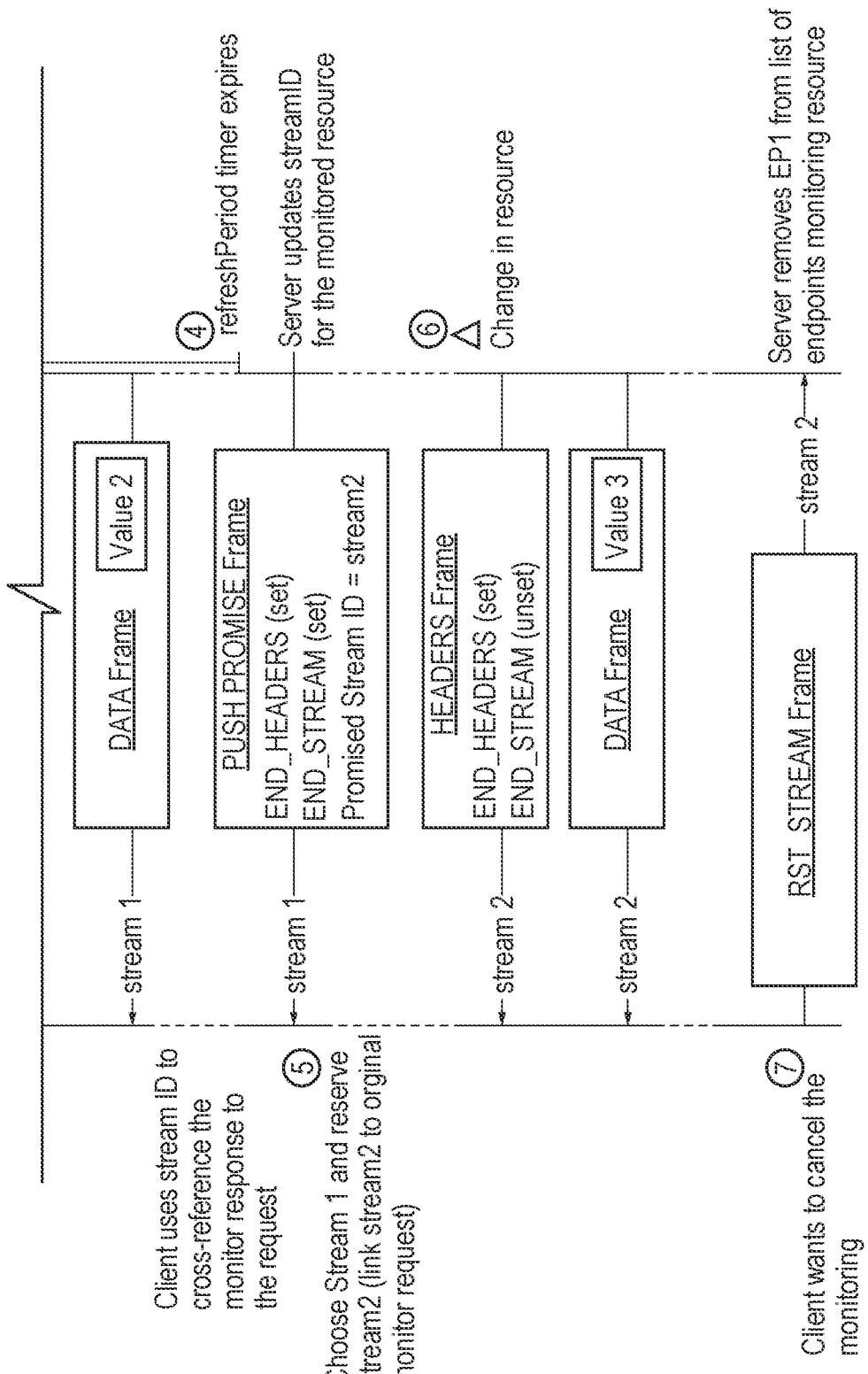

FIG. 19A and FIG. 19B together illustrate a second method in which an application at Client 102 endpoint (EP1) may be interested in monitoring/res1 on Server endpoint (EP2). The Client 102 may need to start a new HTTP/2 connection 802 to the server 104, if not already available.

In step 1 of FIGS. 19A-B, the client 102 issues the monitoring request on a new stream, using the next available stream identifier (shown as stream1 in FIGS. 19A-B). Client 102 sends a request to Server 104 to monitor/res1 and to keep refreshing this monitoring. This may be achieved through a GET request transmitted with two new header fields: (1) Monitor—set to ON; and serverRefresh—set to ON.

The header fields indicate that the GET request is actually a monitor request for the resource and that the Client 102 is asking the Server 104 to refresh the monitoring every refreshPeriod. The request is sent via a HEADERS frame (and zero or more CONTINUATION frames) with the HEADERS frame having an unset END_STREAMS flag—leaving the stream open allows the Client 102 to refresh the resource monitoring (if necessary) or to cancel the resource monitoring, and with the last frame having a set END_HEADERS flag.

Alternatively, the new header fields may be carried as a new field in the HEADERS frame payload. As another alternative, the monitor request may be carried by a new MONITOR request. The Client 102 may also specify a preferred refresh period in the monitor request, using any of the methods described above.

In step 2 of FIGS. 19A-B, Server 104 adds Client 102 to list of endpoints that are monitoring resource (/res1) and stores the stream ID linked to this monitored resource (stream1). Server 104 issues a response on stream1. The response is sent via a HEADERS frame (if necessary one or more CONTINUATION frames) and a DATA frame. The DATA frame has a new flag (END_DATA) set to 1, to inform the Client 102 that the resource representation is fully contained in the current DATA frame, and that the Server 104 will keep stream1 open for future responses. The Server 104 starts a refresh timer to allow refreshing the monitoring on a new stream. The timer has a duration of refreshPeriod. The Server 104 may optionally store the information carried in the response header fields.

In step 3 of FIGS. 19A-B, upon the next change in state of resource/res1, the Server 104 sends a new DATA frame to the Client 102 on stream1. The Server 104 may first check if the header information has changed since the last response.

If not, the Server 104 may send a DATA frame on stream1, with END_DATA flag set to 1. This informs the Client 102 that the resource representation is fully contained in the current DATA frame and that the header fields are identical to those carried in the last response message (this option is not shown in the figure).

Otherwise, the Server 104 may send a new HEADERS frame with each response. In such a case, since the Client 102 is monitoring a resource on stream1, it should not treat the reception of this HEADERS frame as a protocol error.

Upon reception of a DATA frame (or HEADERS, CONTINUATION, and DATA frame) the Client 102 uses the stream ID to cross reference the response to the monitor request.

In step 4 of FIGS. 19A-B, the refresh timer expires. The Server 104 needs to refresh the monitoring of/res1. It achieves this by issuing a Push request to the Client 102, reserving a new stream for the future responses from the monitored resources. This is achieved through a PUSH_PROMISE frame (and zero or more CONTINUATION frames) sent on stream1, with the header fields that the Server 104 attributes to the original monitor request in Step 1,
   PUSH_PROMISE frame having a set END_STREAMS flag, to mark the closure of stream1,
   PUSH_PROMISE frame specifying the reserved stream ID to be used for future responses from the monitored resources (shown as stream2 in the figure), and
   the last frame having a set END_HEADERS flag.

Server 104 restarts the refresh timer. Server 104 updates the stream ID linked to this monitored resource (from old stream (stream1) to the new stream (stream2)).

In step 5 of FIGS. 19A-B, upon reception of the Push request, the Client 102 closes the old stream ID (stream1) and reserves the new stream (stream2). Client 102 also maps the new stream (stream2) to the original monitored request. This last step, allows the Client 102 to determine that a resource representation received on this new stream is actually a response to the monitor request that was made on stream1.

In step 6 of FIGS. 19A-B, upon the next change in state of resource/res1, the Server 104 sends a new DATA frame to the Client 102 on stream2. The rest of the processing is similar to Step 3 of FIGS. 19A-B. Note that in the figure, the option where the Server 104 sends the HEADERS frame (prior to the DATA frame) is shown. The Server 104 may have optionally omitted this frame, if the information carried is identical to that carried in the prior monitor response.

The Step 4-6 of FIGS. 19A-B may be repeated until the Client 102 or the Server 104 cancels its monitoring request (step 7 of FIGS. 19A-B).

In step 7 of FIGS. 19A-B, The Client 102 (or Server 104) issues a request message to cancel the monitoring of /res1. This may be achieved through a RST_STREAM frame on stream2, which notifies the receiving endpoint to cancel the monitoring, or through a new dedicated frame. Note that new RST_STREAM error codes may be defined to indicate the reason for cancelling the monitoring (e.g. too many active monitoring requests on a server 104, transfer of monitoring from one stream to another, application no longer interested in resource, etc.)

It is understood that the entities performing the steps illustrated in FIGS. 19A-B may be logical entities that may be implemented in the form of software (i.e., computer-executable instructions) stored in a memory of, and executing on a processor of, a network apparatus or computer system such as those illustrated in FIG. 24C or FIG. 24D. That is, the method(s) illustrated in FIGS. 19A-B may be implemented in the form of software (i.e., computer-executable instructions) stored in a memory of a network apparatus, such as the apparatus or computer system illustrated in FIG. 24C or FIG. 24D, which computer executable instructions, when executed by a processor of the apparatus, perform the steps illustrated in FIGS. 19A-B. It is also understood that any transmitting and receiving steps illustrated in FIGS. 19A-B may be performed by communication circuitry of the apparatus under control of the processor of the apparatus and the computer-executable instructions (e.g., software) that it executes.

Method 1C: Client/Server Heartbeat Mechanism

Methods 1A and 1B may include the client 102 or server 104 to refresh the monitoring request, and to use this exchange to implicitly extend the life of the HTTP/2 connection 802. As a result, the monitoring refresh and the extension of the HTTP/2 connection 802 are linked. Alternatively, there may be situations where there is no link between refreshing a monitoring request and extending a HTTP/2 connection 802. This allows a client 102 and server 104 to independently keep a connection open, regardless of the resource monitoring activity.

Refreshing the resource monitoring can still be achieved using any of methods 1A or 1B described above. However, the HTTP/2 connection 802 may be extended using one of the following methods. First, at a pre-established or negotiated rate, similar to refreshPeriod, the server 104 may send an empty or "special" frame which will have the effect of looking like the monitoring is still ongoing. It may be a special HEADERS frame or a DATA frame with a flag EMPTY FRAME. Second, a special/dedicated stream may be established for new HEARTBEAT frames that may be sent between client 102 and server 104. These frames may be acknowledged by the receiving endpoint. The client 102 and server 104 may negotiate the frequency of transmission of such frames through the HTTP/2 SETTINGS frame.

2. Start New HTTP Connection

In a second set of methods described herein, the monitoring may be enabled by closing the HTTP/2 connection 802 and using some mechanism to trigger the establishment of a new HTTP/2 connection 802 when the Server 104 needs to send a response for a monitored resource. The methods may include pre-establishing the port the Client 102 will listen to in case of a connection loss. This may be done through negotiation between the Client 102 and Server 104. The middleboxes between server 104 and client 102 may use DPI to observe this signaling so that they are aware of the ports that will be used to establish a future connection. In particular, firewalls may use this information to leave open the ports that the server 104 will use to establish the connection 802.

In one variation, the Server 104 may send the Client 102 an initiate-connection signal on the pre-established port, and the Client 102 may be responsible to start a new HTTP/2 connection 802 to allow the Server 104 to send future monitored responses. The initiate-connection signal may be implemented through a RESTful mechanism. For example, the Client 102 may tell the Server 104 the resource it will monitor for the initiate-connection signal (/initiate_connection_for_res1). The Server 104 will write to this resource to trigger a new HTTP/2 connection 802.

In another alternate variation, typically suited to cases where the Client 102 can accept incoming HTTP/2 connections, it is the Server 104 that initiates a new HTTP/2 connection 802 to the Client 102 on the pre-established port. When there is a change in the monitored resource, the Server 104 sends the new resource representation to the Client 102. For example, the Client 102 may tell the Server 104 that it would like to have all new resource representations stored in local resource (/client_copy_of_res1). The Server 104 will POST (or PUT) to this resource, every time it needs to send a new monitored response. Note that in the new HTTP/2 connection 802, the two endpoints have changed roles. EP2, which behaves like a client 102, POSTs (or PUTs) to EP1, which behaves like a server 104.

Method 2A: Client Starts New HTTP/2 Connection

Figure 20A:
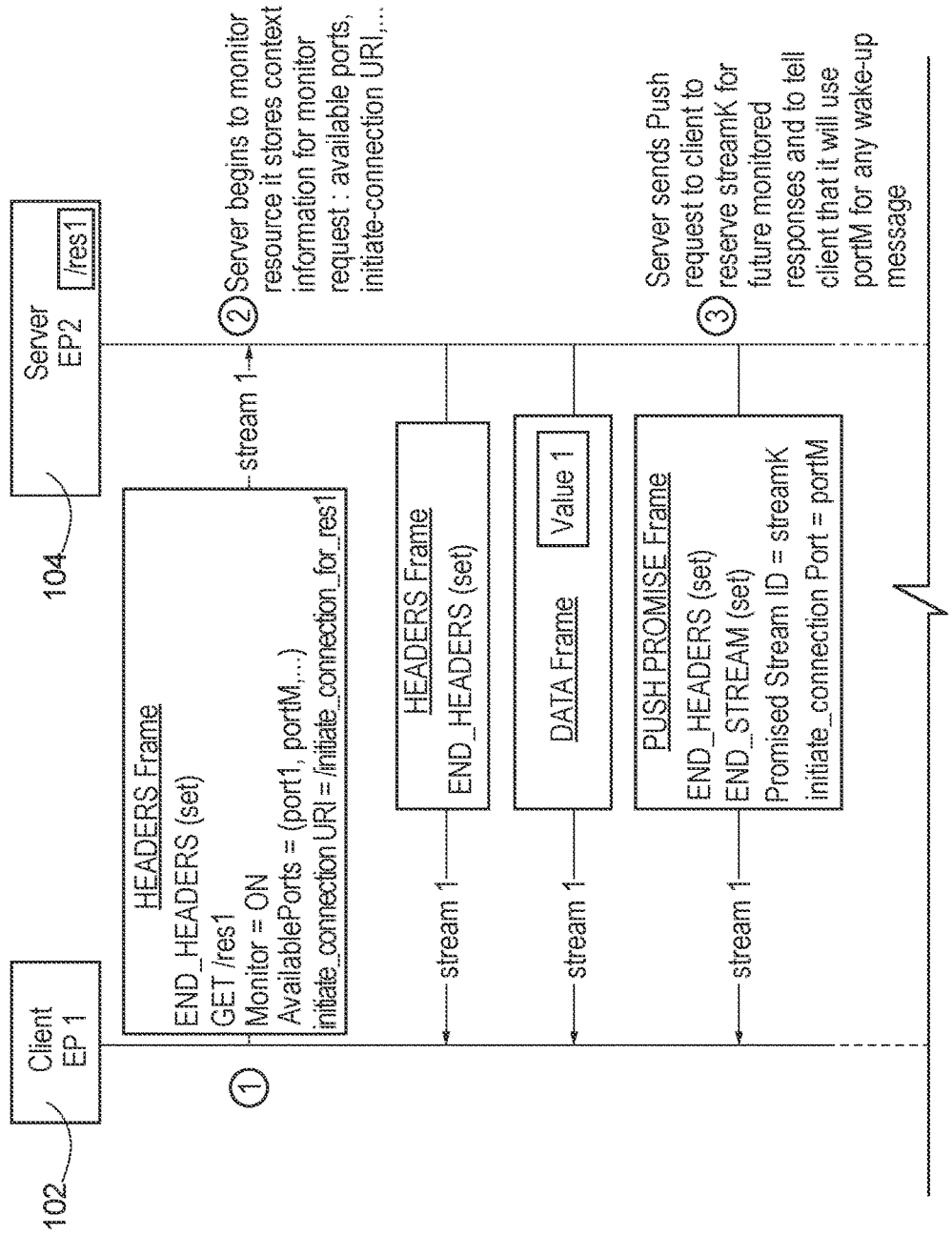
FIG. 20A, FIG. 20B, and FIG. 20C together comprise a flow chart that illustrates a client starting a new HTTP/2 connections (Solution 2A).
Figure 20B:
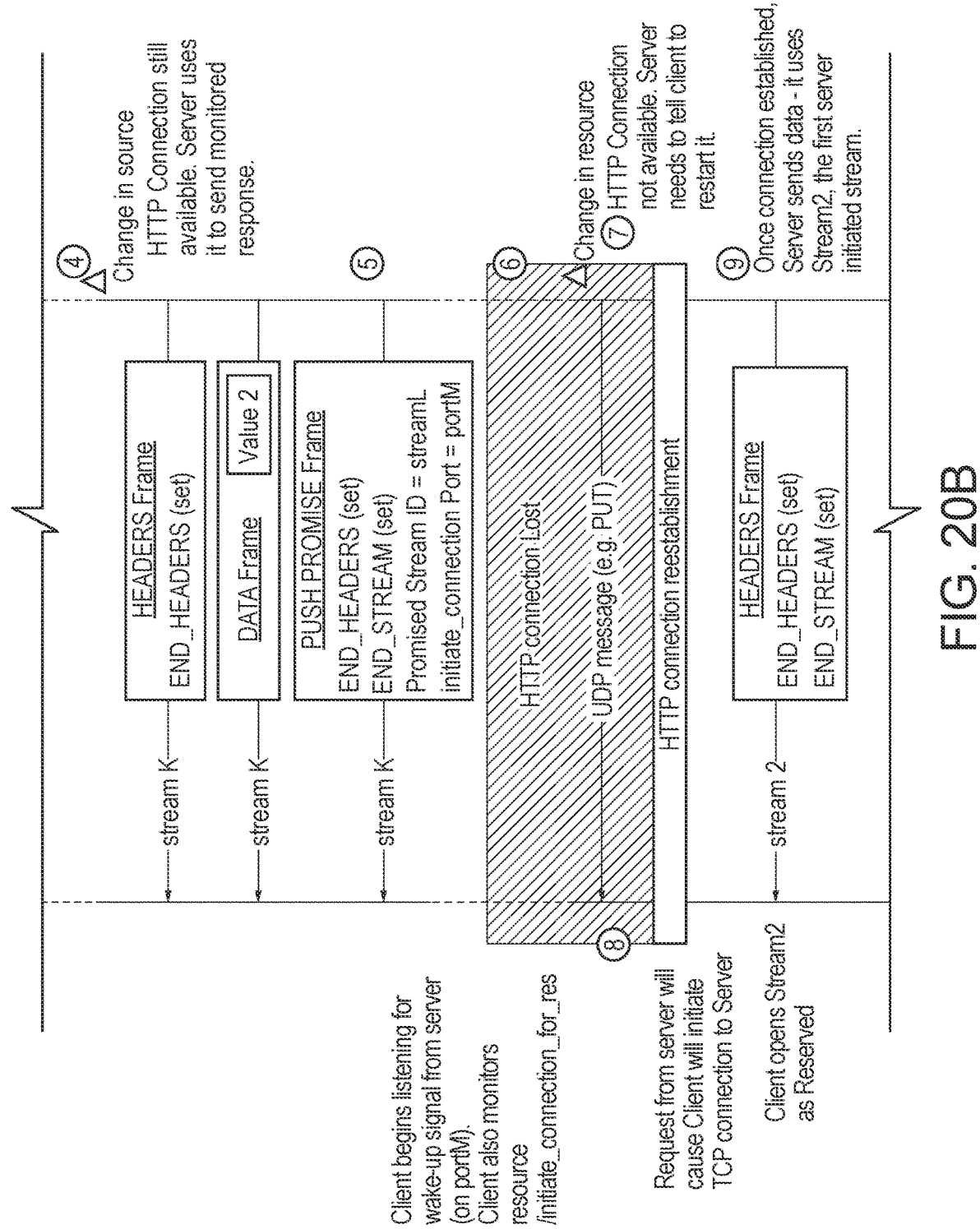
Figure 20C:
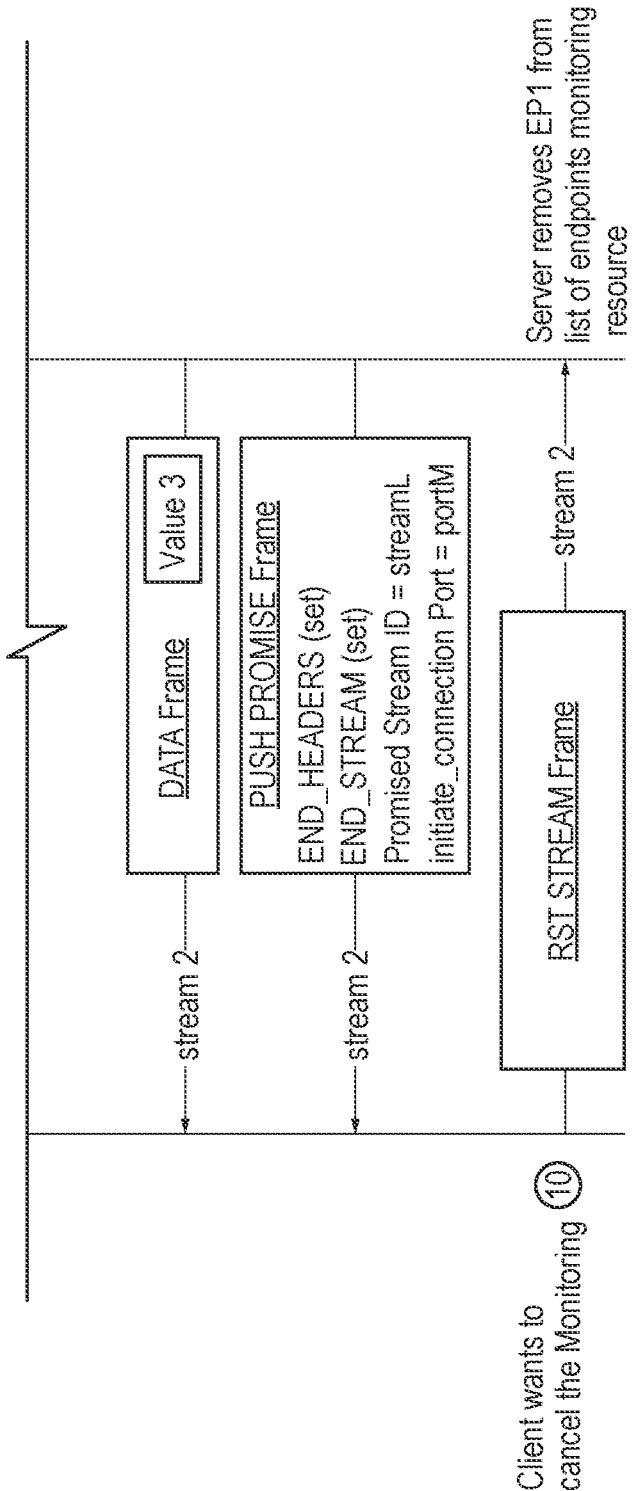

FIG. 20A, FIG. 20B, and FIG. 20C together illustrate a first method of this group in which an application at Client endpoint (EP1) 102 may be interested in monitoring/res1 on Server endpoint (EP2) 104. The Client 102 may need to start a new HTTP/2 connection 802 to the Server 104, if not already available.

In step 1 of FIGS. 20A-C, the client 102 issues the monitoring request on a new stream, using the next available stream identifier (shown as stream1 in FIGS. 20A-C); that is, Client 102 sends a request to Server 104 to monitor/res1. This may be achieved through a GET request transmitted with A new header field (Monitor) set to ON, A new header field (AvailablePorts) that includes a list of available ports which the client 102 is willing to leave open for any future initiate-connection signal from the server 104, A new header field (Initiate-Connection URI) that includes the initiate-connection URI of the monitored resource (/initiate_connection_for_res1).

These header fields may indicate to the Server 104 that the GET request is actually a monitor request for the resource, and that the Client 102 is asking the Server 104 to send an initiate-connection signal on one of the available ports, if the HTTP/2 connection 802 is lost. The request may be sent via a HEADERS frame (and zero or more CONTINUATION frames) with a HEADERS frame having an unset END_STREAMS flag, and the last frame having a set END_HEADERS flag. Alternatively the new header fields may be carried as a new field in the HEADERS frame payload. Alternatively the monitor request may be carried in a new MONITOR request.

In step 2 of FIGS. 20A-C, The Server 104 begins to monitor/res1. It may also store context information for the monitor request: AvailablePorts, Initiate-Connection URI, etc. It sends the monitored response via a HEADERS frame (zero or more CONTINUATION frames) and a DATA frame.

In step 3 of FIGS. 20A-C, The Server 104 sends a Push request (on stream1) to inform the client 102 to reserve streamK for future monitored responses and, if current HTTP/2 connection 802 is lost, to listen on portM (one of the available ports provided by the client 102) for an initiate-connection signal. This may be achieved through a PUSH_PROMISE frame with the following payload fields: (1) Promised Stream ID set to streamK; and (2) (new)

Initiate-Connection Port set to portM. Client 102 links streamK to the original monitor request.

In step 4 of FIGS. 20A-C, if the HTTP/2 connection 802 is still available, then upon the next change in state of resource/res1, the Server 104 sends a new DATA frame to the client 102 on streamK. The Server 104 may first check if the header information has changed since the last response.

If not, the Server 104 may send a DATA frame on streamK (this option is not shown in the figure). Otherwise, the Server 104 may send a new HEADERS frame and DATA frame with each monitored response.

In step 5 of FIGS. 20A-C, the Server 104 sends a Push request to inform the client 102 to reserve streamL for future monitored responses and, if current HTTP/2 connection 802 is lost, to listen on portM (one of the available ports provided by the client 102) for an initiate-connection signal.

In step 6 of FIGS. 20A-C, the HTTP/2 connection 802 is lost (for example as a result of the underlying TCP connection which is broken by a middlebox). As the Client 102 is still interested in monitoring resource/res1, it begins to listen on portM, as instructed by the Server 104 in the last Push request, and to monitor a state change on resource/initiate_connection_for_res1.

In step 7 of FIGS. 20A-C, at the next state change in resource/res1, the server 104 sends a UDP message to the Client 102 to write ON into resource/initiate_connection_for_res1. This can be done through a simple PUT-like method. In order to increase the reliability of this message, the Client 102 may repeat this message a fixed number of times.

In step 8 of FIGS. 20A-C, upon change in state of resource/initiate_connection_for_res1 to ON, the Client 102 is aware that there is a pending monitored response for/res1. Client 102 initiates a new HTTP/2 connection 802 with the Server 104.

In step 9 of FIGS. 20A-C, the server 104 can monitor the incoming HTTP/2 connections, and cross-reference the client address to determine that the monitor response can be sent over a server 104 initiated stream. Note that stream2 is shown in the figure, as this is the first server 104 initiated stream on a connection 802. However, the server 104 may alternatively use streamL (the negotiated stream on the last Push request). Following the monitor response, the Server 104 sends a Push request to set up future responses.

Steps 5-9 of FIGS. 20A-C may be repeated until the Client 102 (or Server 104) cancels the monitoring request (step 10 of FIGS. 20A-C).

In step 10 of FIGS. 20A-C, The Client 102 (or Server 104) issues a request message to cancel the monitoring of/res1. This may be achieved through a RST_STREAM frame on stream2, which notifies the receiving endpoint to cancel the monitoring, or through a new dedicated frame.

Note that in the above description a typical call flow of the solution is presented. Various alternatives are possible for a number of the highlighted steps. First, the solution may be extended to allow the client 102 and/or the server 104 to refresh the resource monitoring. For example, as an alternative to step 9, the Client 102 may use the initiate-connection signal to trigger a refresh of the monitor request to resource/res. Second, the information carried in the PUSH_PROMISE frames (for example at Steps 3 and 5) may alternatively be carried as new header fields and included in the HEADERS frames with each new monitored response.

As the client 102 needs to keep the pre-established port open, it may be more vulnerable to denial-of-service attacks. One or more of the following mechanisms may be used to minimize these attacks. First the Client 102 may open the port only when needed. For instance, only during periods where it determines that the connection 802 to the Server 104 is lost, and the Client 102 is still interested in the monitored resource. Second, the open port may be changed regularly. For instance, the server 104 may randomly pick a new port from the available list for each new connection 802. Third, the Client 102 may limit the duration that the port is open. For instance, the port may be open for a very strict short time period.

In addition, the call flow of FIGS. 20A-C assumes that the client 102 maintains its IP address after it closes the HTTP/2 connection 802. However, this cannot be guaranteed in all cases, especially if monitored responses are very infrequent. For example any client 102 using the 3GPP cellular network may change its IP address as it moves from cell to cell. These clients may even detach from the cellular network. In such cases, before sending the initiate-connection signal, the server 104 may need to trigger the client 102 to attach to the network and then may need to determine the client IP address. The server 104 may ask the 3GPP network to send a trigger to the client 102 to have the client 102 reestablish a connection 802 with the cellular network. 3GPP network may then provide the new client IP address to the server 104. Alternatively, the server 104 may perform a DNS look up on a device identifier to find the device's IP address. Once the server 104 knows the IP address, it may send the initiate-connection signal.

It is understood that the entities performing the steps illustrated in FIGS. 20A-C may be logical entities that may be implemented in the form of software (i.e., computer-executable instructions) stored in a memory of, and executing on a processor of, a network apparatus or computer system such as those illustrated in FIG. 24C or FIG. 24D. That is, the method(s) illustrated in FIGS. 20A-C may be implemented in the form of software (i.e., computer-executable instructions) stored in a memory of a network apparatus, such as the apparatus or computer system illustrated in FIG. 24C or FIG. 24D, which computer executable instructions, when executed by a processor of the apparatus, perform the steps illustrated in FIGS. 20A-C. It is also understood that any transmitting and receiving steps illustrated in FIGS. 20A-C may be performed by communication circuitry of the apparatus under control of the processor of the apparatus and the computer-executable instructions (e.g., software) that it executes.

Method 2B: Server Starts New HTTP/2 Connection

Figure 21A:
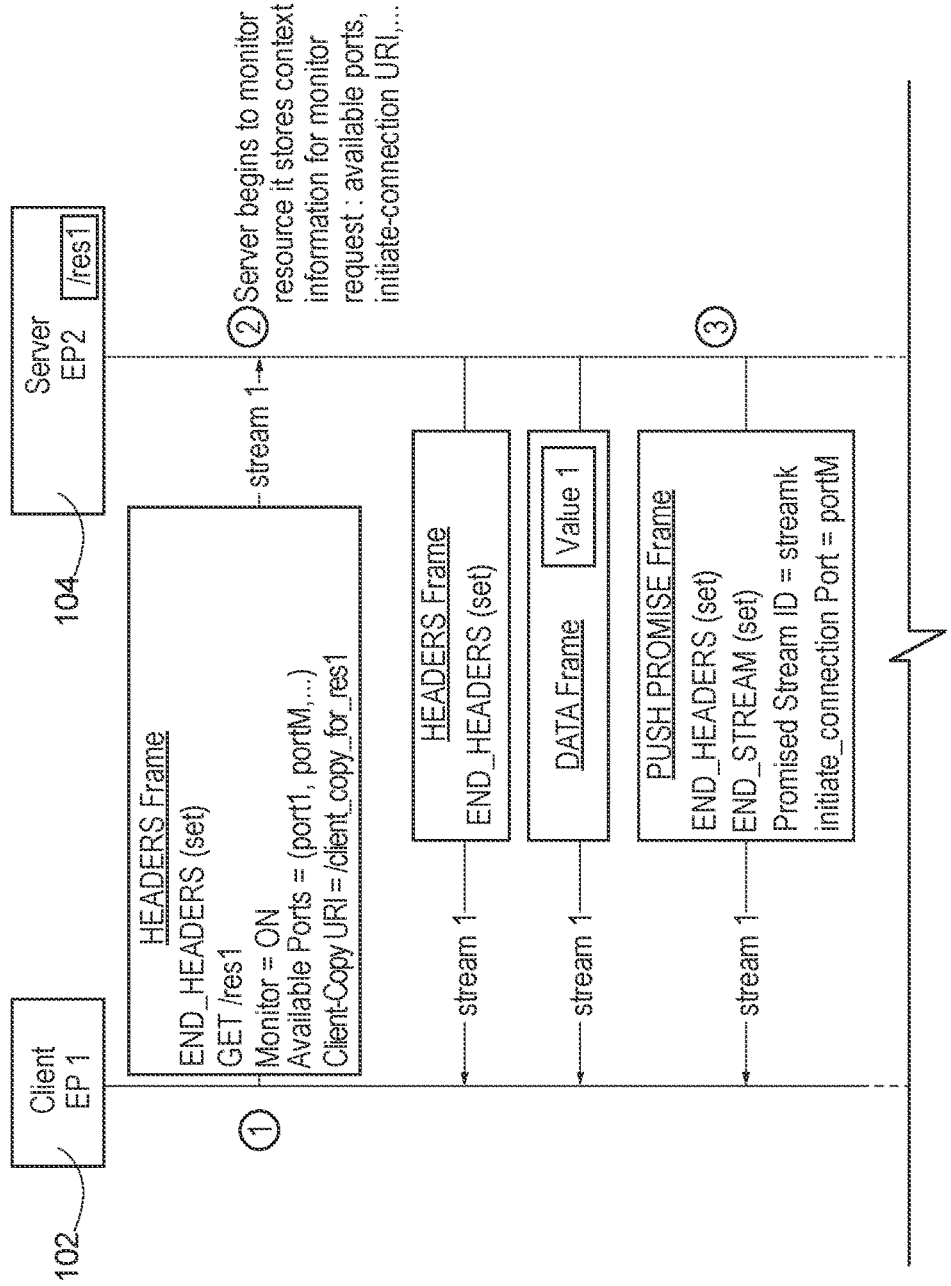
FIG. 21A, FIG. 21B, and FIG. 21C together comprise a flow chart that illustrates a server starting new HTTP/2 Connection (Solution 2B).
Figure 21B:
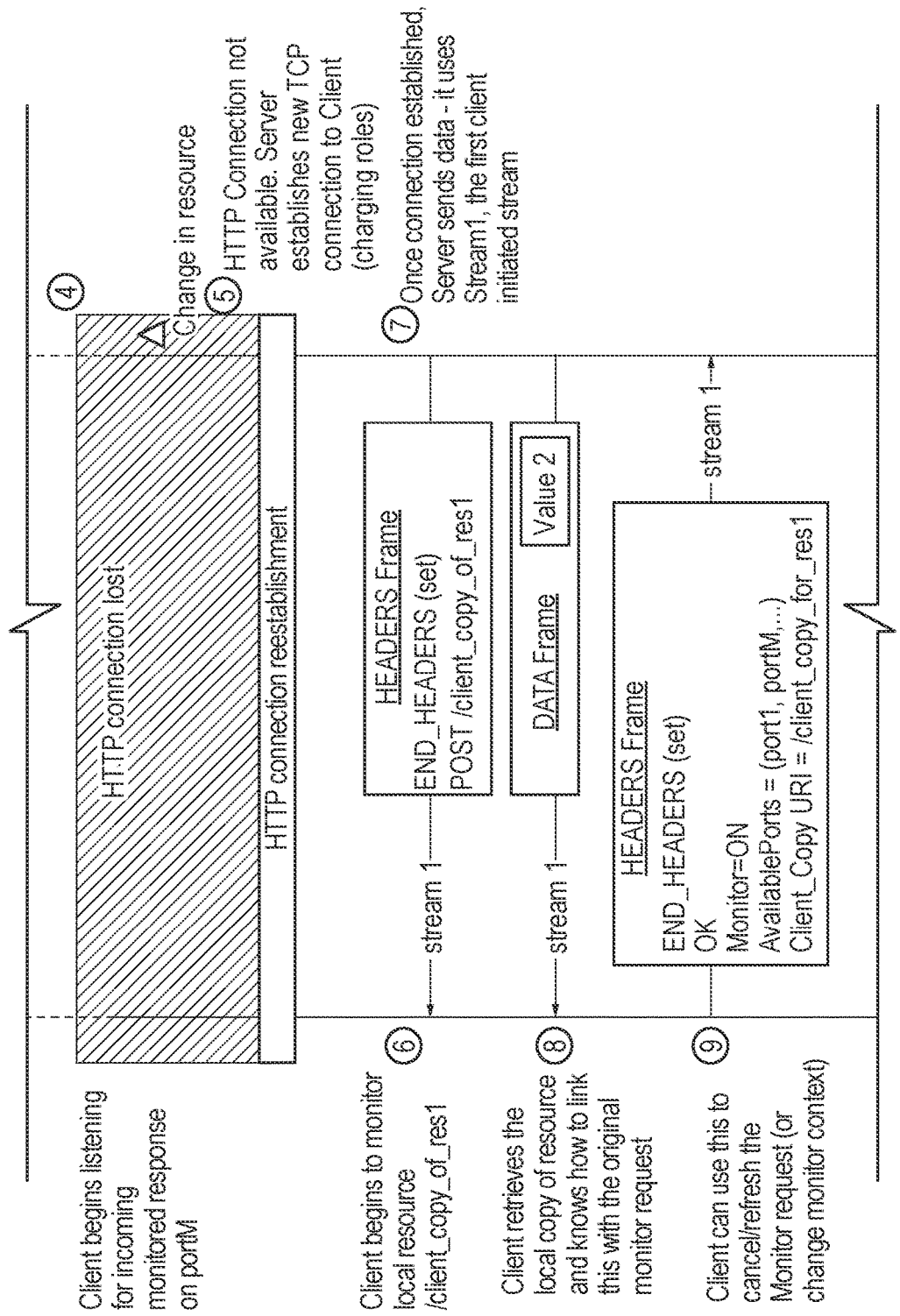
Figure 21C:
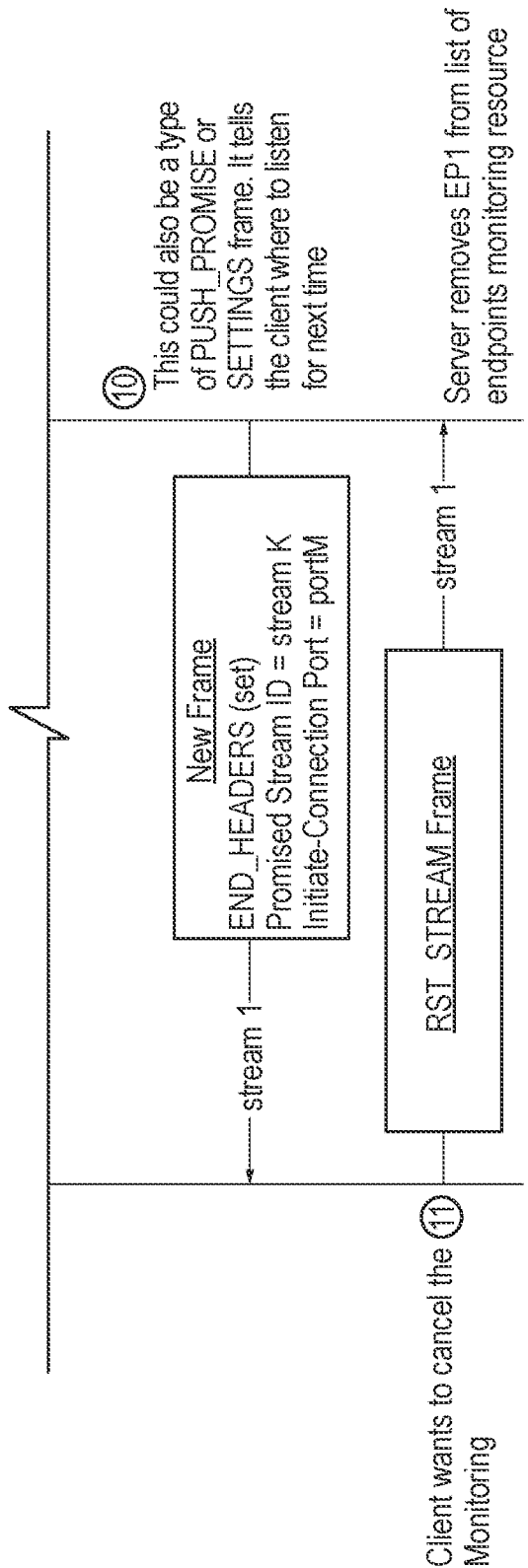

FIG. 21A, FIG. 21B, and FIG. 21C together illustrate another method in which an application at Client endpoint (EP1) 102 may be interested in monitoring/res1 on Server endpoint (EP2) 104. The client 102 may need to start a new HTTP/2 connection 802 to the server 104, if not already available.

In step 1 of FIGS. 21A-C, the client 102 issues the monitoring request on a new stream, using the next available stream identifier (shown as stream1 in FIGS. 21A-C); that is, Client 102 sends a request to Server 104 to monitor/res1. This may be achieved through a GET request transmitted with:

A new header field (Monitor) set to ON,

A new header field (AvailablePorts) that includes a list of available ports which the Client 102 is willing to leave open for future server-initiated communications, A new header field (Client-Copy URI) that includes the URI of the Client resource where it expects the Server 104 to store the monitored response (/client_copy_of_res1).

These header fields may indicate to the Server 104 that the GET request is actually a monitor request for the resource, and that the Client 102 is asking the Server 104 to start a new HTTP/2 connection 802, on one of the available ports, if the current HTTP/2 connection 802 is lost. The request is sent via a HEADERS frame (and zero or more CONTINUATION frames) with (1) HEADERS frame having an unset END_STREAMS flag, and (2) the last frame having a set END_HEADERS flag. Alternatively the new header fields may be carried as a new field in the HEADERS frame payload. As another alternative, the monitor request may be transmitted through a new MONITOR request.

In step 2 of FIGS. 21A-C, the Server 104 begins to monitor/res1. It may also store context information for the monitor request: AvailablePorts, client-Copy URI, etc. It sends the resource representation via a HEADERS frame (zero or more CONTINUATION frames) and a DATA frame.

In step 3 of FIGS. 21A-C, the Server 104 sends a Push request to inform the client 102 to reserve streamK for future monitored responses and to listen on portM (one of the available ports provided by the Client 102).

This may be achieved through a PUSH_PROMISE frame with the following payload fields: (1) Promised Stream ID set to streamK, and (2) (new) Initiate-Connection Port set to portM. Client 102 links streamK to the original monitor request.

In step 4 of FIGS. 21A-C, the HTTP/2 connection 802 is lost (for example as a result of the underlying TCP connection which is broken by a middlebox). As the Client 102 is still interested in monitoring resource/res1, it begins to listen on portM, as instructed by the Server 104 in the last Push request.

In step 5 of FIGS. 21A-C, at the next state change in resource/res1, the server 104 initiates a HTTP/2 connection 802 with the Client 102, on the agreed portM.

In step 6 of FIGS. 21A-C, after connection 802 establishment, the Client 102 begins to monitor Client resource: /client_copy_of_res1. This is where the Server 104 will PUT the monitored response.

In step 7 of FIGS. 21A-C, server 104 sends the resource representation on a new stream (shown as stream1 in FIGS. 21A-C) using a HEADERS frame (zero or more CONTINUATION frames) and a DATA frame. The Server 104 may use a PUT (or POST) request to store the monitored resource representation at the negotiated resource/client_copy_of_res1.

In step 8 of FIGS. 21A-C, the Client 102 links the resource in /client_copy_of_res1 to the original monitor request (in step 1).

In step 9 of FIGS. 21A-C, the Client 102 issues a response to the Server 104 request on stream1. It may use this response to modify the list of available ports for upcoming monitored resource responses, to modify the URI of the resource to locally store the monitored response, etc.

In step 10 of FIGS. 21A-C, the Server 104 may send a new frame to confirm the setup for the next monitored response (on stream1). This may be a modified PUSH_PROMISE frame.

Steps 5-10 of FIGS. 21A-C are repeated each time the HTTP/2 connection 802 is lost, and this until the client 102 (or Server 104) cancels its monitoring request (step 11 of FIGS. 21A-C)

In step 11 of FIGS. 21A-C, the Client 102 (or Server 104) issues a request message to cancel the monitoring of/res1. This may be achieved through a RST_STREAM frame on the current stream, which notifies the receiving endpoint to cancel the monitoring.

Note that in Steps 3 and 10 of FIGS. 21A-C, the configuration for the future monitored response is included in new request Header fields or new fields in HEADERS frames. Alternatively these may be included as new configuration parameters in a SETTINGS frame.

It is understood that the entities performing the steps illustrated in FIGS. 21A-C are logical entities that may be implemented in the form of software (i.e., computer-executable instructions) stored in a memory of, and executing on a processor of, a network apparatus or computer system such as those illustrated in FIG. 24C or FIG. 24D. That is, the method(s) illustrated in FIGS. 21A-C may be implemented in the form of software (i.e., computer-executable instructions) stored in a memory of a network apparatus, such as the apparatus or computer system illustrated in FIG. 24C or FIG. 24D, which computer executable instructions, when executed by a processor of the apparatus, perform the steps illustrated in FIGS. 21A-C. It is also understood that any transmitting and receiving steps illustrated in FIGS. 21A-C may be performed by communication circuitry of the apparatus under control of the processor of the apparatus and the computer-executable instructions (e.g., software) that it executes.

Method for Monitoring a Resource on Alternative Servers

Figure 22:
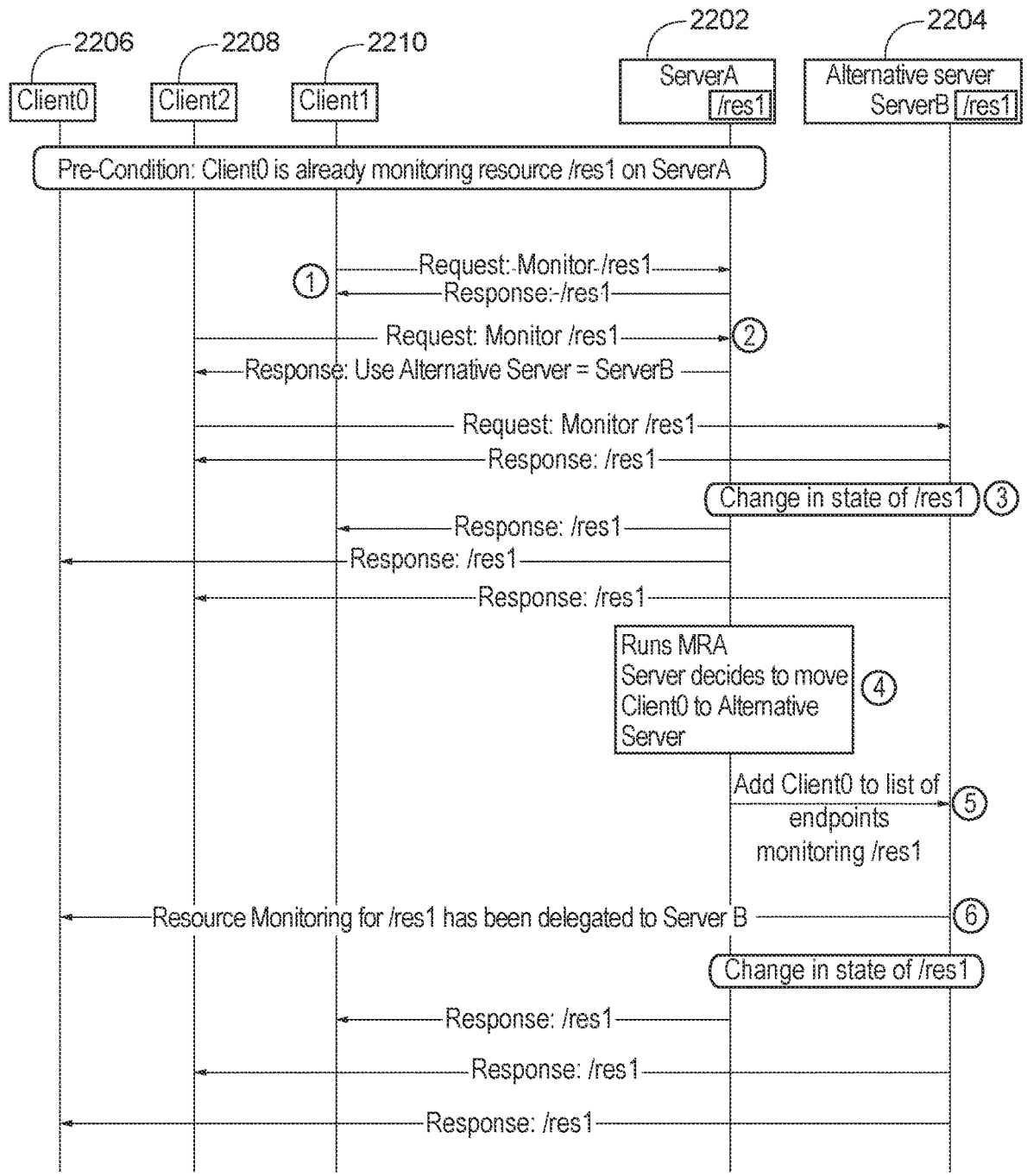
FIG. 22 is a flow chart that illustrates monitoring a resource on alternative servers (Solution 3).

FIG. 22 illustrates a method for monitoring a resource on alternative servers. In the exemplary flow chart of FIG. 22, an application at a client endpoint may be interested in monitoring/res1 on a primary Server endpoint (Server A) 2202. Primary ServerA 2202 may have an alternative server endpoint (Server B) 2204.

As the material presented in this section applies to any method for resource monitoring, an attempt has been made to show only generic exchanges of "monitor requests" and "monitor responses". These generic exchanges may map to any method. In fact, the focus of this section is the inter-server exchange to delegate resource monitoring to an alternative server.

It is assumed that primary server (Server A) 2202 and alternative server (Server B) 2204 may communicate to exchange information and configuration. For instance this allows the resources in the primary server and alternative server to remain in sync.

The servers may be equipped with a monitoring rebalancing algorithm (MRA). This algorithm may be run every time a monitoring request is received by a primary server 2202, and/or it may be run periodically. The algorithm may evaluate if the server 2202 should be responsible for sending the monitored responses, or if the server 2202 should delegate this task to an alternative server, such as server 2204. The server 2202 may base this decision on a number of metrics/factors. The algorithm may monitor these metrics and other factors and makes a decision for the resource monitoring.

One metric/factor may be the current load at the primary server 104 and alternative server. If this load exceeds a certain threshold, the primary server may delegate the monitoring to an alternative server.

Another metric/factor may be the number of active HTTP/2 connections at the primary server and alternative server. If this number exceeds a certain threshold, the primary server may delegate the monitoring to an alternative server.

Yet another metric/factor may be the proximity of a client 102 to the primary server and alternative server. The proximity may be based on different parameters and/or their combinations, such as IP address prefix or round trip time (RTT) estimate between the primary server-client and between the alternative server-client. The primary server may regularly send HTTP/2 PING frames to the client to evaluate RTT. To determine the RTT between the client and the alternative server, two approaches may be employed.

In the first approach, the primary server may rely on the alternative server. The primary server may supply the client address to the alternative server, and ask it to evaluate the RTT to the client. If the alternative server already has a HTTP/2 connection 802 to the client, then it may issue a PING frame in this connection 802 to determine the RTT. Otherwise, the alternative server may need to initiate a new HTTP/2 connection 802 to the client before sending the PING frame. Once the RTT is determined, the alternative server may terminate the HTTP/2 connection 802 to the client if this connection 802 was established simply for evaluating RTT. The alternative server may send the RTT information to the primary server, or it may store the RTT locally and have it retrieved by the primary server. Alternatively, the alternative server may send an Internet Control Message Protocol (ICMP) PING message to determine the RTT to the client.

In the second approach, the primary server may rely on the client. The primary server may supply the address of the alternative server to the client, and ask it to evaluate the RTT to the alternative server. If the client already has a HTTP/2 connection 802 to the alternative server, then it may issue a PING frame in this connection 802 to determine the RTT. Otherwise, the client may need to initiate a new HTTP/2 connection to the alternative server before sending the PING frame. Once the RTT is determined, the client may terminate the HTTP/2 connection 802 to the alternative server, if this connection 802 was established simply for evaluating RTT. The client may send the RTT information to the primary server, or it may store the RTT locally and have it retrieved by the primary server. Alternatively, the client may send an ICMP PING message to determine the RTT to the alternative server.

The call flow in FIG. 22 shows the interactions between client, primary server 2202, and alternate server 2204. Steps are shown by encircled numbers. It is assumed that ServerA 2202 is already monitoring resource/res1 for Client0.

In step 1 of FIG. 22, Client1 2210 asks to monitor resource (/res1) on ServerA 2202. It may also inform ServerA 2202 that it is willing to have its resource monitoring delegated to an alternative server, if needed. ServerA 2202 runs a monitoring rebalancing algorithm and for this client determines that it is willing to perform the monitoring. It sends a monitored response to Client1 2210. This response may optionally include the status of the metrics used to evaluate the monitoring rebalancing. For instance, it may include an indication of the number of active HTTP/2 connections being managed by ServerA 2202.

In step 2 of FIG. 22, Client2 2208 asks to monitor resource (/res1) on ServerA 2202. ServerA 2202 runs a monitoring rebalancing algorithm and, for this client, determines that Client2 2208 is better served by the alternative server (ServerB 2204). The primary server responds to the monitoring request with and ALTSVC frame pointing to alternative server (ServerB 2204). Client2 2208 then establishes monitoring of/res1 through ServerB 2204.

In step 3 of FIG. 22, any state change in/res1 will trigger a monitored response from ServerA 2202 to Client0 2206 and Client1 2210, as well as a monitored response from ServerB 2204 to Client2 2208. Periodically, or as a result of some threshold condition (e.g. number of active HTTP/2 connections exceeds a threshold), ServerA 2202 runs the monitoring rebalancing algorithm.

In step 4 of FIG. 22, ServerA 2202 determines that Client0 2206 monitoring needs to be delegated to alternative server (ServerB 2204).

In step 5 of FIG. 22, ServerA 2202 sends a request to ServerB 2204 to add Client0 2206 to the list of endpoints monitoring/res1. This request may include the address of Client0 2206, as well as any other context related to this monitoring. For example if the method 2B: Server Starts New HTTP/2 Connection is employed for monitoring, then this context may include the list of available ports for Client0 2206, the URI for the local copy of the monitored resource (/client_copy_of_res1), etc.

This may be achieved through a GET request transmitted with:
  a. A new header field (Monitor) set to ON,
  b. A new field with the address of Client0 2206.
  c. A new header field that includes the context of the monitoring request;
  These header fields indicate to the server that the GET request is actually a delegation request from ServerA 2202 to have ServerB 2204 monitor the resource, and to send the monitored responses to Client0 2206. The request is sent via a HEADERS frame (and zero or more CONTINUATION frames) with:
  d. HEADERS frame having an unset END_STREAMS flag, and
  e. the last frame having a set END_HEADERS flag.

Alternatively the new header fields may be carried as new fields in the HEADERS frame payload.

In step 6 of FIG. 22, ServerB 2204 needs to inform Client0 2206 about the delegation. Client0 2206 has to be told that the monitored responses will now be coming from ServerB 2204. This may be achieved by having ServerB 2204 initiate a HTTP/2 connection 802 with Client0 2206 and then PUT the monitored response in resource/client_copy_of_res1. The change of source address may be sufficient for Client0 2206 to determine that a monitor delegation has occurred.

Alternatively, some other unique identifier may be used to link this monitored response to the original monitor request to ServerA.

As an alternative to Step 5 and Step 6 of FIG. 22, ServerA 2202 may send an indication to Client0 2206 to use an alternative server for its monitoring. ServerA 2202 may send an ALTSVC frame to client0 2206, that points to ServerB 2204. Client0 2206 will use this to cancel the current monitoring on ServerA 2202, and initiate a new monitoring on ServerB 2204.

It is understood that the entities performing the steps illustrated in FIG. 22 may be logical entities that may be implemented in the form of software (i.e., computer-executable instructions) stored in a memory of, and executing on a processor of, a network apparatus or computer system such as those illustrated in FIG. 24C or FIG. 24D. That is, the method(s) illustrated in FIG. 22 may be implemented in the form of software (i.e., computer-executable instructions) stored in a memory of a network apparatus, such as the apparatus or computer system illustrated in FIG. 24C or FIG. 24D, which computer executable instructions, when executed by a processor of the apparatus, perform the steps illustrated in FIG. 22. It is also understood that any transmitting and receiving steps illustrated in FIG. 22 may be performed by communication circuitry of the apparatus under control of the processor of the apparatus and the computer-executable instructions (e.g., software) that it executes.

Enhanced Monitor Request

The method presented above have assumed that a request to monitor resource/res1, is a request to the server to inform the client when there is a change in the specified resource (/res1). This change could be as a result of an update to resource/res1 (say through a PUT or POST operation). In some cases, the client may be interested in other properties of the resource, for instance, if the resource/res1 has been retrieved, or is being monitored by another client (a $3^{rd}$ party client).

The enhanced monitoring may be implemented with a new MONITOR method, or alternatively by issuing an enhanced GET method. In either case, the client may provide the reason for monitoring in the request using a new header field (Monitor Purpose). The server would look at this field to determine what should be monitored on resource/res1—updates, reads, other monitors, etc.

If a monitor response is triggered the server may issue a response with targeted/specific information. For example, for a request to monitor updates, the server may respond with the contents of the resource/res1. For a request to monitor read operations, the server may respond with a special frame indicating that the resource has been read. For a request to monitor $3^{rd}$ party monitor requests on the resource, the server may respond with a special frame indicating that a new monitor request has been made on the resource and it may also provide the type of monitoring that has been requested.

HTTP/2 Embodiment

In a preferred embodiment, the methods described herein may be implemented within HTTP/2. In this embodiment, new functionality is described for use at the endpoints to enable resource monitoring. Additionally, signaling/framing changes are described to support this new functionality.

1. New HTTP/2 Endpoint Functionality

The following new functionality may be implemented at the client HTTP/2 endpoints.

First, new functionality may be implemented to enable resource monitor requests through an enhanced HTTP/2 GET method that provides the following information: MONITOR, SERVER_REFRESH, AvailablePorts, Initiate-Connection URI, Client-Copy URI.

Second, new functionality may be implemented to cancel a resource monitoring request through either an enhanced HTTP/2 GET method that provides the following information: MONITOR; or through a RST_STREAM frame.

Third, new functionality may be implemented to enable resource monitoring by cross-referencing monitored responses through one or more of the following methods: the response stream ID matching the monitor request stream ID, the response stream ID matching the reserved stream ID promised by the server for a future monitored response, or resource representation written to the Client-Copy URI.

Fourth, new functionality may be implemented to monitor the Initiate-Connection URI to trigger start of a new HTTP/2 connection 802.

The following new functionality may be implemented at the server HTTP/2 endpoints.

First, new functionality may be implemented to manage the monitor request. Keeping track of the monitor context to link a streamID to a monitored resource.

Second, new functionality may be implemented to determine if monitored response needs header information, or if it can be sent using only a DATA frame.

Third, new functionality may be implemented to issue a Push request to refresh a monitor request.

New functionality may be implemented to send a UDP message to Initiate-Connection URI to have client start a new HTTP/2 connection 802.

Fourth, new functionality may be implemented to establish a new HTTP/2 connection 802 to a client and POSTing to the Client-Copy URI to send monitored responses.

Fifth, new server functionality may be implemented to delegate resource monitoring to an alternative server.

2. New/Enhanced HTTP/2 Framing

The following describes new flags and fields that may be implemented in the HTTP/2 frame payloads to enable the functionality described above.

First, two new flags may be added to the HEADERS frame:

MONITOR (0x40): When set, bit 6 indicates that the sender is making a monitor request. This flag is only set for GET methods and it may be ignored if used with other methods. When Unset, bit 6 indicates that the sender is cancelling the monitor request.

SERVER_REFRESH (0x80): When set, bit 8 indicates that the sender is asking the receiver to refresh the monitor request. This flag is only relevant if associated with a HEADERS frame initiating a monitor request, and can otherwise be ignored at the receiver. When Unset, bit 8 indicates that the sender will handle refreshing the monitor request.

The following optional fields may be added to the HEADERS frame:

DELETE_STREAM: A 31-bit stream identifier for the stream that is to be deleted by the receiver.

Number of Ports: A 4-bit field containing the number of ports included as AvailablePorts AvailablePorts: A 16-bit port number to identify ports that are available to the receiver, if the receiver needs to communicate with the sender Initiate-Connection URI: Variable length field to hold URI to be used for initiate-connection signal from receiver Client-Copy URI: Variable length field to hold URI to be used for local storage of monitored responses from server The following optional fields may be added to the PUSH_PROMISE frame:

Initiate-Connection Port: A 16-bit port number to identify the port the receiver should monitor for any future initiate-connection signal from the sender.

A new END_DATA flag may be added to the DATA frame, with the following definition:

END_DATA (0x20): When set, bit 5 indicates to the receiver that the resource representation is fully contained in the current DATA frame, and that the sender will keep the current stream open for future responses.

Graphical User Interface

Figure 23:
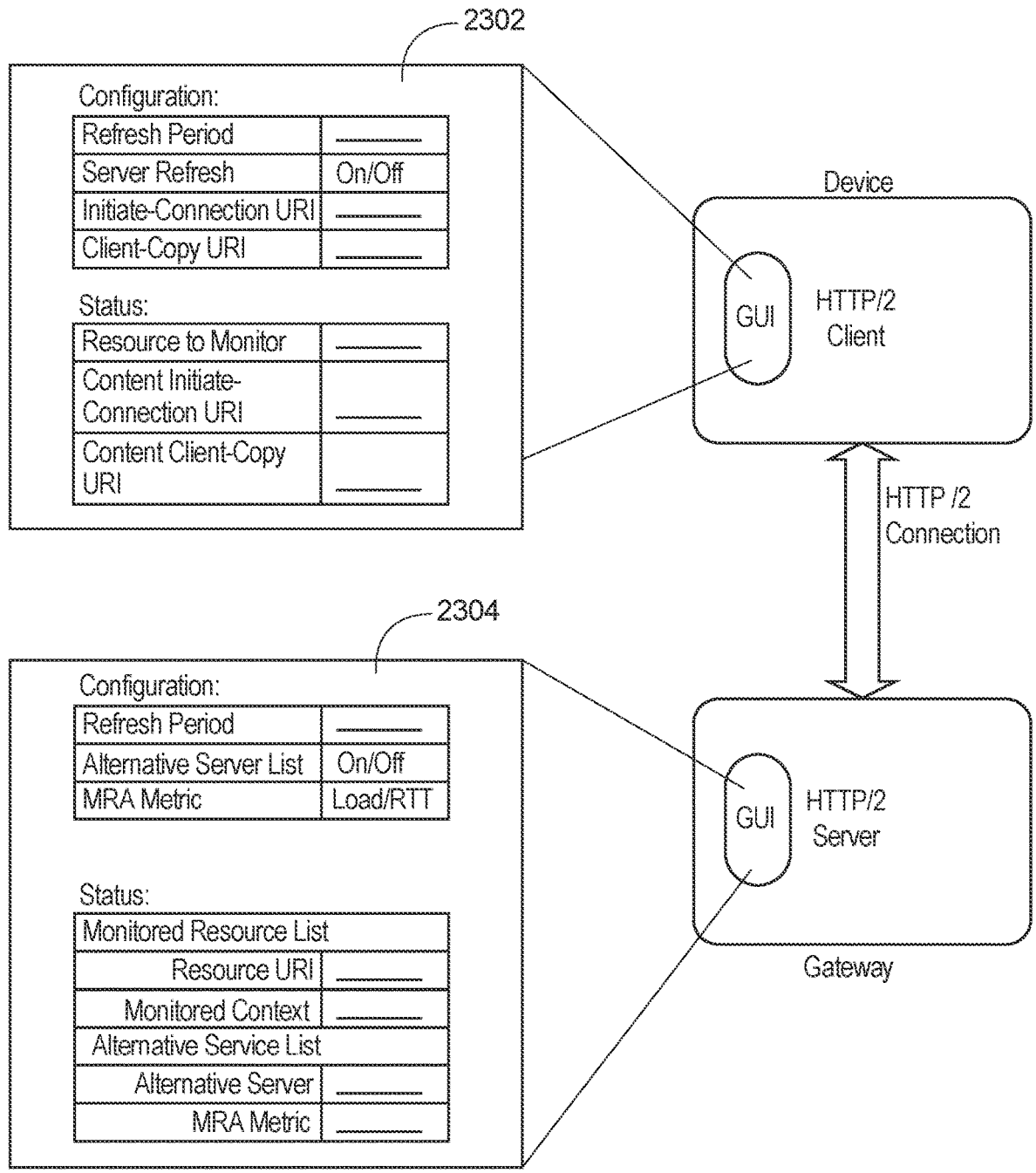
FIG. 23 is a diagram of a Graphical User Interface of one embodiment.

The above discussed mechanisms may be configured and observed through one or more Graphical User Interfaces (GUIs). FIG. 23 shows an example M2M/IoT device and gateway, each supporting HTTP/2. On the client side, interface 2302 may be used to configure the refreshPeriod, server refresh, the Initiate-Connection URI, and the Client-Copy URI. In addition, the interface 2302 may be used to enable and select a resource to monitor, or to view the contents in the Initiate-Connection URI and Client-Copy URI. On the server side, interface 2304 may be used to configure the refreshPeriod, the list of alternate servers, etc. In addition, the interface 2304 may be used to list the resources that are being monitored, the monitoring context for each of these, the metrics for the alternative servers, etc. It is to be understood that interfaces 2302 and 2304 can be produced using displays such as those shown in FIGS. 24C-D described below.

Example M2M/IoT/WoT Communication System

The various methods described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 24A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed.

As shown in FIG. 24A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 24A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 24B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include elements, functionality, and logical entities such as client 102, 2206, 2208, and 2210, server 104, 1702, 2202, and 2204, logical entities to create an HTTP/2 connection 802, and HTTP/2 streams 804, alternate server 1202, application 1502, sensors 1504, blower control 1506, and logical entities to produce interfaces such as interface 2302 and 2304.

The M2M service layer 22 may be implemented by one or more servers, computers, devices, virtual machines (e.g. cloud/storage farms, etc.) or the like, including for example the devices illustrated in FIGS. 24C and 24D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprise servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider.

Referring also to FIG. 24B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

One or more of the elements, functionality and logical entities described may be hosted within a M2M service layer instance hosted by an M2M node, such as an M2M server, M2M gateway, or M2M device, as shown in FIG. 24B. For example, such elements, functionality and logical entities may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 24C or FIG. 24D described below.

Further, the elements, functionality and logical entities described herein may be implemented as part of an M2M network that uses a Service Oriented Architecture (SOA) and/or a Resource-Oriented Architecture (ROA) to access services of the present application.

FIG. 24C is a block diagram of an example hardware/software architecture of a M2M network node 30, such as an M2M device 18, an M2M gateway 14, an M2M server, or the like. Any of the client 102, 2206, 2208, and 2210, server 104, 1702, 2202, and 2204, alternate server 1202, application 1502, sensors 1504, blower control 1506, and the like may be embodied in the form of node 30.

The node 30 can be part of an M2M network as shown in FIG. 24A-B or part of a non-M2M network. As shown in FIG. 24C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 24C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 24C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 24C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane FIG. 24D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. For example, the computing system 90 may be used to implement any one or more of the clients 102, 2206, 2208, and 2210, server 104, 1702, 2202, and 2204, alternate server 1202, application 1502, sensors 1504, blower control 1506, and the like described herein. Computing system 90 can be an M2M device, user equipment, gateway, UE/GW or any other nodes including nodes of the mobile core network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 24A and FIG. 24B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 24 A-B or the node 30 of FIG. 24 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further including computer executable instructions stored in the memory of the apparatus which, when executed by the processor of the apparatus, cause the apparatus to:
receive a monitor request from a client to monitor a resource, wherein the monitor request includes a list of ports the client is willing to leave open and a resource the client will monitor in case of a connection loss;
send a message to the client to indicate a port to monitor in case of a loss of a first hypertext transfer protocol version 2 (HTTP/2) connection with the client, the first HTTP/2 connection for sending a monitor response to inform the client about a change of state of the monitored resource;
upon a change of state of the monitored resource when the first HTTP/2 connection is not available, send a message initiating a connection to the client via the port;
receive a connection establishment signal from the client;
link a new HTTP/2 connection to the monitor request; and
send, using the new connection, a monitor response to inform the client about the change of state of the monitored resource using the new HTTP/2 connection.

2. The apparatus of claim 1, wherein the apparatus is a server.

3. The apparatus of claim 1, wherein the monitor request includes a resource where the server should store future monitor responses in case of a connection loss.

4. The apparatus of claim 1, wherein the message initiating a connection is sent on the port and to the resource indicated in the monitor request.

5. The apparatus of claim 1, wherein the message initiating a connection is sent using User Datagram Protocol (UDP).

6. An apparatus comprising a processor and a memory, the apparatus further including computer executable instructions stored in the memory of the apparatus which, when executed by the processor of the apparatus, cause the apparatus to:
receive a monitor request from a client to monitor a resource, the monitor request including information concerning a preferred operation in case of a loss of a first hypertext transfer protocol version 2 (HTTP/2) connection with the client, the first HTTP/2 connection for sending a monitor response to inform the client about a change of state of the monitored resource, wherein the information concerning the preferred operation in case of a loss of the first HTTP/2 connection includes a list of ports the client is willing to leave open;
send a message to the client to indicate a port to monitor in case of a loss of the first HTTP/2 connection;
upon a change of state of the monitored resource or if the first HTTP/2 connection with the client is lost, open a new HTTP/2 connection to the client on the port;
link the new HTTP/2 connection to the monitor request; and
send new monitor responses to the client using the new HTTP/2 connection.

7. The apparatus of claim 6, wherein the apparatus is a server.

8. The apparatus of claim 6, wherein the information concerning the preferred operation in case of a loss of the first HTTP/2 connection includes a resource where the server should store future monitor responses in case of a loss of the first HTTP/2 connection loss.

9. The apparatus of claim 6, wherein a new monitor response is sent by storing it at the client, at a location indicated in the message.

10. A method comprising:
receiving a monitor request from a client to monitor a resource, wherein the monitor request includes a list of ports the client is willing to leave open;
sending a message to the client to indicate a port to monitor in case of a loss of a first hypertext transfer protocol version 2 (HTTP/2) connection with the client, the first HTTP/2 connection for sending a monitor response to inform the client about a change of state of the monitored resource;
upon a change of state of the monitored resource when the first HTTP/2 connection is not available, send a message initiating a connection to the client via the port;
receiving a connection establishment signal from the client;
linking a new HTTP/2 connection to the monitor request; and
sending, using the new connection, a monitor response to inform the client about the change of state of the monitored resource using the new HTTP/2 connection.

11. The method of claim 10, wherein the monitor request includes a resource where the server should store future monitor responses in case of a loss of the first HTTP-2 connection.

12. The method of claim 10, wherein a new monitor response is sent on the port and to the resource by storing it at the client, at a location indicated in the message.

13. The method of claim 10, wherein the message initiating a connection is sent using User Datagram Protocol (UDP).

14. A method comprising:
receiving a monitor request from a client to monitor a resource, the monitor request including information concerning a preferred operation in case of a loss of a first hypertext transfer protocol version 2 (HTTP/2) connection with the client, the first HTTP/2 connection for sending a monitor response to inform the client about a change of state of the monitored resource, wherein the information concerning the preferred operation in case of a loss of the first HTTP/2 connection includes a list of ports the client is willing to leave open;
sending a message to the client to indicate a port to monitor in case of a loss of the first HTTP/2 connection;
upon a change of state of the monitored resource when or if the first connection with the client is lost, opening a new HTTP/2 connection to the client on the port;
linking the new HTTP/2 connection to the monitor request; and
sending new monitor responses to the client about the change of state of the monitored resource using the new connection HTTP/2 connection.

15. The method of claim 14, wherein the information concerning the preferred operation in case of a loss of the first HTTP/2 connection includes a resource where the server should store future monitor responses in case of a loss of the first HTTP/2 connection.

16. The method of claim 14, wherein a new monitor response is sent by storing it at the client, at a location indicated in the message.

* * * * *